(12) United States Patent
Lei et al.

(10) Patent No.: US 11,470,614 B1
(45) Date of Patent: Oct. 11, 2022

(54) FREQUENCY HOPPING ENABLING FOR AN UPLINK CONTROL CHANNEL TRANSMISSION BY A USER EQUIPMENT

(71) Applicant: QUALCOMM Incorporated, San Diego, CA (US)

(72) Inventors: Jing Lei, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/651,366

(22) Filed: Feb. 16, 2022

Related U.S. Application Data

(60) Provisional application No. 63/260,038, filed on Aug. 6, 2021.

(51) Int. Cl.
*H04W 72/04* (2009.01)
*H04L 5/00* (2006.01)
*H04W 74/08* (2009.01)

(52) U.S. Cl.
CPC ......... *H04W 72/048* (2013.01); *H04L 5/0012* (2013.01); *H04W 72/044* (2013.01); *H04W 72/0413* (2013.01); *H04W 74/0841* (2013.01)

(58) Field of Classification Search
None
See application file for complete search history.

(56) References Cited

U.S. PATENT DOCUMENTS 10,965,434 B1 * 3/2021 Babaei .................. H04L 5/0096
11,283,482 B2 * 3/2022 Matsumura ........... H04L 5/0091

* cited by examiner

*Primary Examiner* — Hong S Cho
(74) *Attorney, Agent, or Firm* — Norton Rose Fulbright LLP

(57) ABSTRACT

An apparatus for wireless communication includes a transmitter configured to communicate with a base station based on a first uplink bandwidth part (BWP) that includes a first frequency subset and that further includes a second frequency subset. The apparatus further includes a receiver configured to receive, from the base station, one or more messages including a frequency hopping indicator that specifies whether a frequency hopping mode is enabled or disabled. The transmitter is further configured to transmit, to the base station, an uplink control channel transmission using both the first frequency subset and the second frequency subset based on the frequency hopping indicator specifying that the frequency hopping mode is enabled or using one of the first frequency subset or the second frequency subset based on the frequency hopping indicator specifying that the frequency hopping mode is disabled.

30 Claims, 9 Drawing Sheets

*800*

Receive, from a base station, one or more messages including a frequency hopping indicator that specifies whether a frequency hopping mode is enabled or disabled for the UE, where the UE is associated with a first uplink bandwidth part (BWP) that includes a first frequency subset and a second frequency subset — 802

Transmit, to the base station, an uplink control channel transmission using: both the first frequency subset and the second frequency subset based on the frequency hopping indicator specifying that the frequency hopping mode is enabled; or one of the first frequency subset or the second frequency subset based on the frequency hopping indicator specifying that the frequency hopping mode is disabled — 804

400

FH enabled: Perform transmission using FH and based on both frequency subsets

FH disabled: Perform transmission without FH and based on one frequency subset

→ Frequency

FREQUENCY HOPPING ENABLING FOR AN UPLINK CONTROL CHANNEL TRANSMISSION BY A USER EQUIPMENT

CROSS-REFERENCE TO RELATED APPLICATIONS

This application claims the benefit of U.S. Provisional Patent Application No. 63/260,038, entitled, "FREQUENCY HOPPING ENABLING FOR AN UPLINK CONTROL CHANNEL TRANSMISSION BY A USER EQUIPMENT," filed on Aug. 6, 2021, which is expressly incorporated by reference herein in its entirety.

TECHNICAL FIELD

Aspects of the present disclosure relate generally to wireless communication systems, and more particularly, to communication systems that use frequency hopping for wireless transmissions.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

In some aspects of the disclosure, an apparatus for wireless communication includes a transmitter configured to communicate with a base station based on a first uplink bandwidth part (BWP) that includes a first frequency subset and that further includes a second frequency subset. The apparatus further includes a receiver configured to receive, from the base station, one or more messages including a frequency hopping indicator that specifies whether a frequency hopping mode is enabled or disabled. The transmitter is further configured to transmit, to the base station, an uplink control channel transmission using both the first frequency subset and the second frequency subset based on the frequency hopping indicator specifying that the frequency hopping mode is enabled or using one of the first frequency subset or the second frequency subset based on the frequency hopping indicator specifying that the frequency hopping mode is disabled.

In some other aspects, an apparatus for wireless communication includes a receiver configured to receive, from a base station, a first indication of a bandwidth associated with the base station and further configured to receive, from the base station, a second indication of a first uplink BWP. The first uplink BWP includes a first frequency subset and that further includes a second frequency subset. The apparatus further includes a transmitter configured to transmit, to the base station, an uplink signal transmission using both the first frequency subset and the second frequency subset based on the first uplink BWP exceeding a threshold that is based at least in part on the bandwidth associated with the base station or using one of the first frequency subset or the second frequency subset based on the first uplink BWP failing to exceed the threshold.

In some other aspects, a method of wireless communication performed by a UE includes receiving, from a base station, one or more messages including a frequency hopping indicator that specifies whether a frequency hopping mode is enabled or disabled for the UE. The UE is associated with a first uplink BWP that includes a first frequency subset and a second frequency subset. The method further includes transmitting, to the base station, an uplink control channel transmission using both the first frequency subset and the second frequency subset based on the frequency hopping indicator specifying that the frequency hopping mode is enabled or using one of the first frequency subset or the second frequency subset based on the frequency hopping indicator specifying that the frequency hopping mode is disabled.

In some other aspects, a method of wireless communication performed by a UE includes receiving, from a base station, a first indication of a bandwidth associated with the base station and further includes receiving, from the base station, a second indication of a first uplink BWP. The first uplink BWP includes a first frequency subset and that further includes a second frequency subset. The method includes transmitting, to the base station, an uplink signal transmission using both the first frequency subset and the second frequency subset based on the first uplink BWP exceeding a threshold that is based at least in part on the bandwidth associated with the base station or using one of the first frequency subset or the second frequency subset based on the first uplink BWP failing to exceed the threshold.

In some other aspects, an apparatus for wireless communication includes a receiver configured to communicate with a UE based on a first uplink BWP associated with the UE. The first uplink BWP includes a first frequency subset and further includes a second frequency subset. The apparatus further includes a transmitter configured to transmit, to the UE, one or more messages including a frequency hopping indicator that specifies whether a frequency hopping mode is enabled or disabled. The receiver is further configured to receive, from the UE, an uplink control channel transmission using both the first frequency subset and the second frequency subset based on the frequency hopping indicator specifying that the frequency hopping mode is enabled or using one of the first frequency subset or the second frequency subset based on the frequency hopping indicator specifying that the frequency hopping mode is disabled.

In some other aspects, an apparatus for wireless communication includes a transmitter configured to transmit, to a UE, a first indication of a bandwidth associated with a base station and further configured to transmit, to the UE, a second indication of a first uplink BWP. The first uplink BWP includes a first frequency subset and that further includes a second frequency subset. The apparatus further includes a receiver configured to receive, from the UE, an uplink signal transmission using both the first frequency subset and the second frequency subset based on the first uplink BWP exceeding a threshold that is based at least in part on the bandwidth associated with the base station or using one of the first frequency subset or the second frequency subset based on the first uplink BWP failing to exceed the threshold.

In some other aspects, a method of wireless communication performed by a base station includes transmitting, to a UE, one or more messages including a frequency hopping indicator that specifies whether a frequency hopping mode is enabled or disabled for the UE. The UE is associated with a first uplink BWP that includes a first frequency subset and a second frequency subset. The method further includes receiving, from the UE, an uplink control channel transmission using both the first frequency subset and the second frequency subset based on the frequency hopping indicator specifying that the frequency hopping mode is enabled or using one of the first frequency subset or the second frequency subset based on the frequency hopping indicator specifying that the frequency hopping mode is disabled.

In some other aspects, a method of wireless communication performed by a base station includes transmitting, to a UE, a first indication of a bandwidth associated with the base station and further includes transmitting, to the UE, a second indication of a first uplink BWP. The first uplink BWP includes a first frequency subset and that further includes a second frequency subset. The method further includes receiving, from the UE, an uplink signal transmission using both the first frequency subset and the second frequency subset based on the first uplink BWP exceeding a threshold that is based at least in part on the bandwidth associated with the base station or using one of the first frequency subset or the second frequency subset based on the first uplink BWP failing to exceed the threshold.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the disclosure may be realized by reference to the following drawings. In the drawings, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
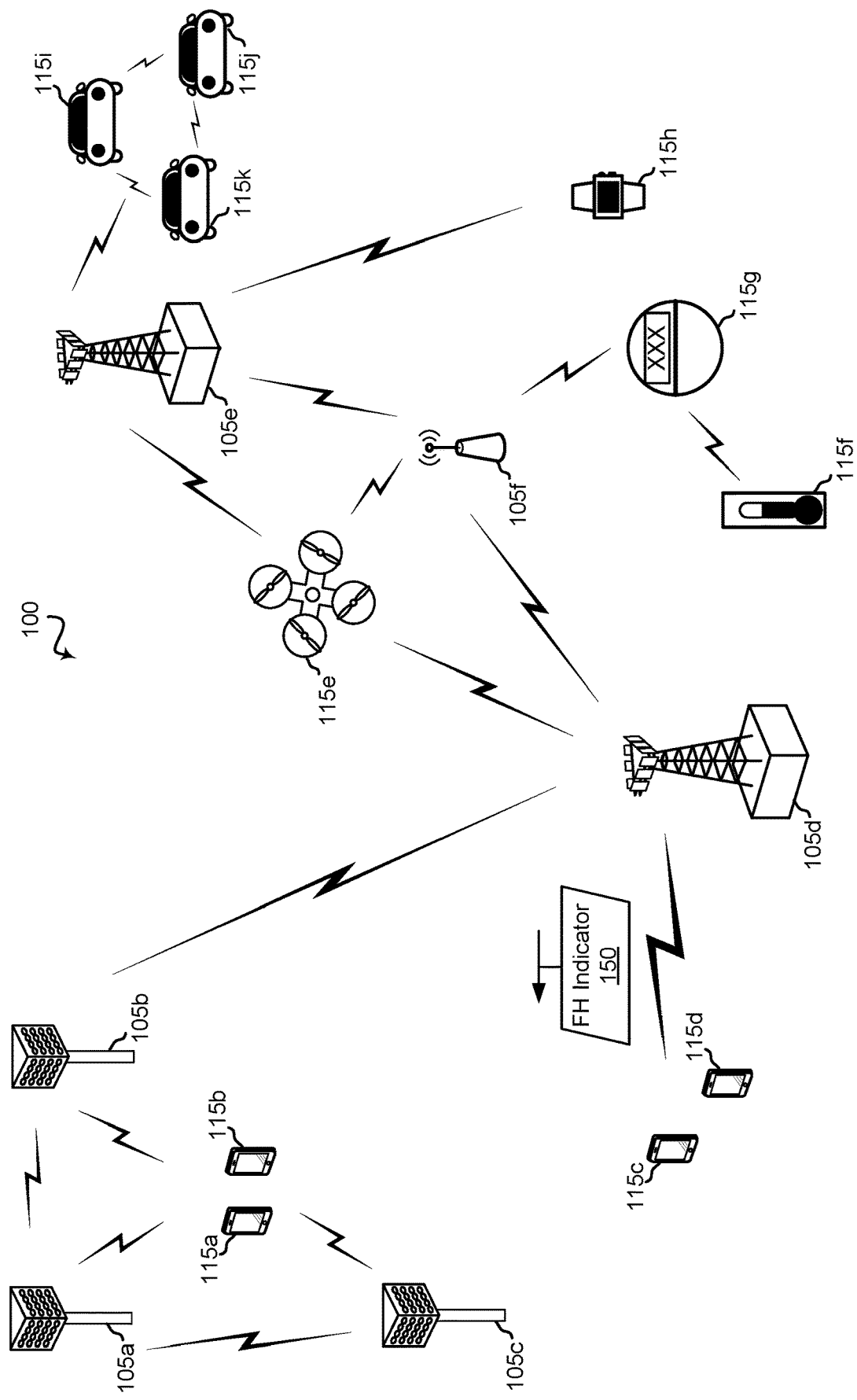
FIG. 1 is a block diagram illustrating details of an example wireless communication system according to some aspects of the disclosure.

Wireless communication systems increasingly support different types of devices with different capabilities. For example, a wireless communication system may include one or more user equipments (UEs) of a first capability type and may further include one or more UEs of a second capability type that is different than the first capability type. In some implementations, first capability type may correspond to a "reduced capability" (RedCap) capability type. In some implementations, a RedCap device may enable reduced cost, reduced device size, or reduced power consumption. The second capability type may correspond to a non-RedCap capability type, such as an embedded mobile broadband (eMBB) capability type, an ultra-reliable low-latency communication (URLLC) capability type, or another capability type.

In some circumstances, a UE of one capability type may introduce noise or interference to another UE of another capability type. As an illustrative example, a RedCap UE may transmit signals using frequencies within a first uplink bandwidth part (BWP) that is associated with the RedCap UE. In some cases, the first uplink BWP may overlap (e.g., may be a subset of) a second uplink BWP associated with another UE, such as a non-RedCap UE. As a result, the frequencies used by the RedCap UE may be unavailable to the non-RedCap UE.

In some examples, the second uplink BWP of the non-RedCap may experience resource fragmentation due to the use of the frequencies by the RedCap UE. For example, if the frequencies used by the RedCap UE include two frequency subsets of the second uplink BWP, then the second uplink BWP may be fragmented into three non-contiguous frequency regions. In some implementations, a transmission by the RedCap UE using the three non-contiguous frequency regions may involve three different packets (e.g., instead of a single packet that may be transmitted using a single, contiguous, non-fragmented frequency region). As a result, latency associated with the non-RedCap UE may be increased, which may be undesirable in some applications (such as in the case of some eMBB or URLLC applications).

In some aspects of the disclosure, a UE may selectively enable or disable frequency hopping for an uplink control channel transmission. In some circumstances, disabling frequency hopping may reduce or avoid resource fragmentation for a second UE. For example, if frequency hopping is disabled, the uplink control channel transmission may use one frequency subset of a first uplink BWP associated with the UE instead of using multiple frequency subsets of the first uplink BWP. As a result, in some examples, resource fragmentation of a second uplink BWP associated with the second UE may be reduced. In some implementations, the frequency subset may be aligned with a frequency boundary of the second uplink BWP to further reduce or avoid resource fragmentation of the second uplink BWP.

Depending on the particular example, enabling or disabling of frequency hopping may be performed using an explicit technique or an implicit technique. In an example of an explicit technique, a base station may transmit a frequency hopping indicator that specifies whether frequency hopping is enabled or disabled for the UE. In some implementations, the base station may transmit the frequency hopping indicator based on a capability type of the UE (e.g., an indication that the UE is associated with a RedCap capability type). To illustrate, the UE may indicate the capability type in a message associated with a random access channel (RACH) procedure, such as a message of type one (msg1) of a four-step RACH procedure, a message of type three (msg3) of the four-step RACH procedure, or a message of type A (msgA) of a two-step RACH procedure. The base station may include the frequency hopping indicator in a message of type two (msg2) or message of type four (msg4) of the four-step RACH procedure, a message scheduling the msg2 or msg4, a message of type B (msgB) of a two-step RACH procedure, a message scheduling the msgB, or a combination of a downlink channel and a control channel, as illustrative examples.

In an implicit technique, the UE may compare the first uplink BWP associated with the UE to a threshold that is based on a system bandwidth associated with the base station. If the first uplink BWP exceeds the threshold, the UE may enable frequency hopping for an uplink control channel transmission. If the first uplink BWP fails to exceed the threshold, the UE may disable frequency hopping for the uplink control channel transmission. In some examples, the threshold corresponds to the product of the system bandwidth and a particular value. The particular value may be specified by the base station or by a wireless communication protocol, as illustrative examples.

By selectively disabling frequency hopping, performance of one or more UEs may be improved. For example, by disabling frequency hopping in one or more cases in which a first uplink BWP of a RedCap UE is included in a second uplink BWP of a non-RedCap UE, resource fragmentation associated with the second uplink BWP may be reduced or avoided. As a result, a number of packets used by the non-RedCap UE to transmit data may be reduced, which may decrease latency in some circumstances.

To further illustrate, in various implementations, one or more aspects described herein may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoT) with an ultra-high density (e.g., ~1 M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105$d$ and 105$e$ are regular macro base stations, while base stations 105$a$-105$c$ are macro base stations enabled with one of 3 dimension (3D), full dimension (FD), or massive MIMO. Base stations 105$a$-105$c$ take advantage of their higher dimension MIMO capabilities to exploit 3D beamforming in both elevation and azimuth beamforming to increase coverage and capacity. Base station 105$f$ is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water infrastructure, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

In some aspects of the disclosure, a base station 105 of FIG. 1 may transmit a frequency hopping (FH) indicator 150 to indicate to a UE 115 whether frequency hopping is enabled or disabled for the UE 115. To illustrate, in some examples, the base station 105d may transmit the FH indicator 150 to the UE 115c to indicate whether frequency hopping is enabled or disabled for the UE 115c. The UE 115c may enable or disable frequency hopping based on the FH indicator 150, as described further below.

Figure 2:
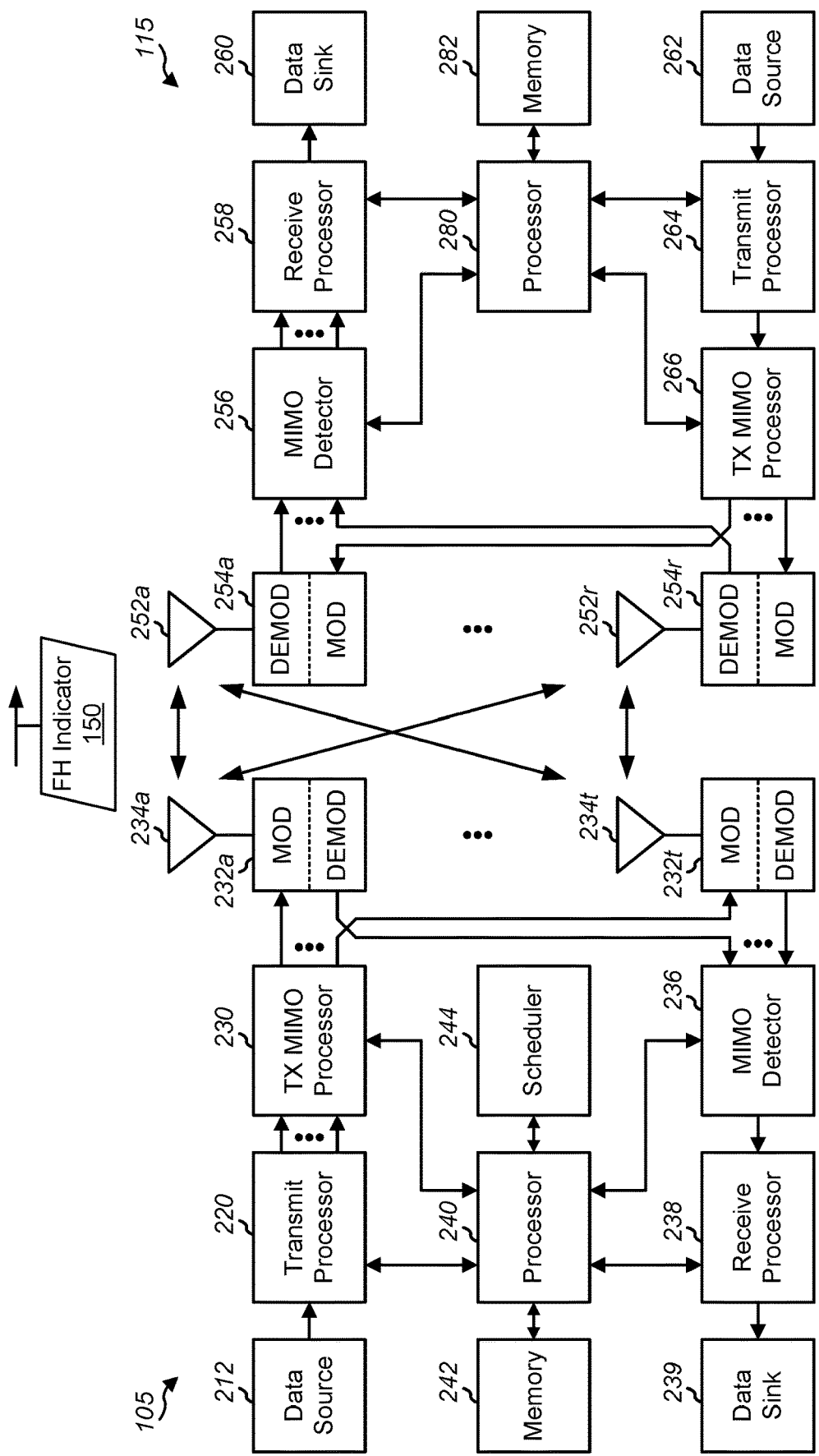
FIG. 2 is a block diagram illustrating examples of a base station and a user equipment (UE) according to some aspects of the disclosure.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from processor 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through

254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to processor 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to processor 240.

Processors 240 and 280 may direct the operation at base station 105 and UE 115, respectively. Processor 240 or other processors and modules at base station 105 or processor 280 or other processors and modules at UE 115 may perform or direct the execution of various processes for the techniques described herein, such as to perform or direct the execution illustrated in FIGS. 8-11, or other processes for the techniques described herein, such as transmission and reception of the FH indicator 150. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
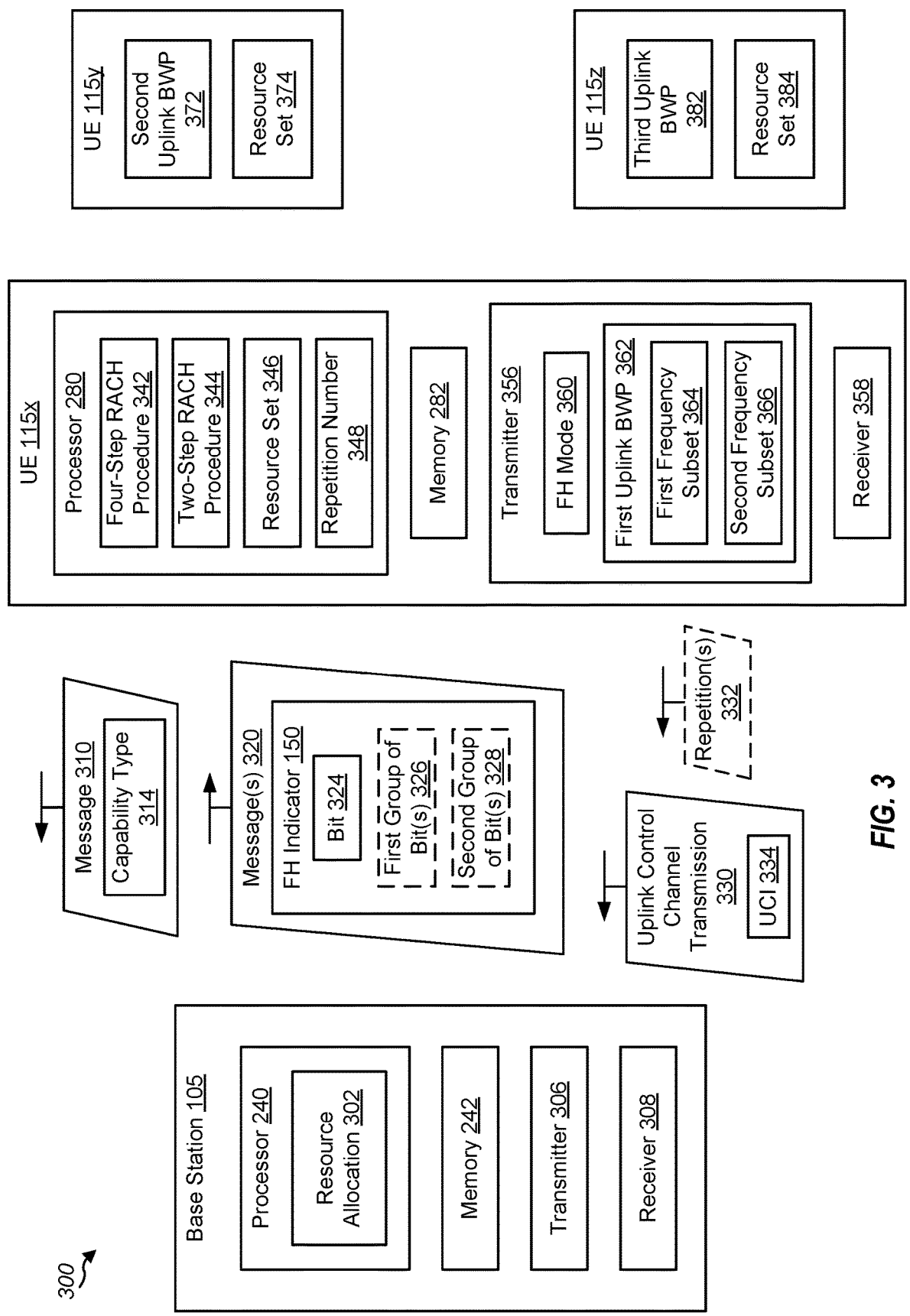
FIG. 3 is a block diagram illustrating an example of a wireless communication system according to some aspects of the disclosure.

FIG. 3 is a block diagram illustrating an example of a wireless communication system 300 according to some aspects of the disclosure. The wireless communication system 300 may include one or more base stations, such as the base station 105. The wireless communication system 300 may further include one or more UEs, such as a UE 115x, a UE 115y, and a UE 115z. In some examples, the UEs 115x-z correspond to UEs 115 illustrated in FIG. 1.

The example of FIG. 3 illustrates that the base station 105 may include one or more processors (such as the processor 240) and may include the memory 242. The base station 105 may further include a transmitter 306 and a receiver 308. The processor 240 may be coupled to the memory 242, to the transmitter 306, and to the receiver 308. In some examples, the transmitter 306 and the receiver 308 include one or more components described with reference to FIG. 2, such as one or more of the modulator/demodulators 232a-t, the MIMO detector 236, the receive processor 238, the transmit processor 220, or the TX MIMO processor 230. In some implementations, the transmitter 306 and the receiver 308 may be integrated in one or more transceivers of the base station 105.

The transmitter 306 may be configured to transmit reference signals, synchronization signals, control information, and data to one or more other devices, and the receiver 308 may be configured to receive reference signals, control information, and data from one or more other devices. For example, the transmitter 306 may be configured to transmit signaling, control information, and data to the UEs 115x-z, and the receiver 308 may be configured to receive signaling, control information, and data from the UEs 115x-z.

Each UE 115x-z may include one or more processors (such as the processor 280), a memory (such as the memory 282), a transmitter (such as a transmitter 356), and a receiver (such as a receiver 358). The processor 280 may be coupled to the memory 282, to the transmitter 356, and to the receiver 358. In some examples, the transmitter 356 and the receiver 358 may include one or more components described with reference to FIG. 2, such as one or more of the modulator/demodulators 254a-r, the MIMO detector 256, the receive processor 258, the transmit processor 264, or the TX MIMO processor 266. In some implementations, the transmitter 356 and the receiver 358 may be integrated in one or more transceivers of the UE 115.

The transmitter 356 may be configured to transmit reference signals, synchronization signals, control information, and data to one or more other devices, and the receiver 358 may be configured to receive reference signals, control information, and data from one or more other devices. For example, in some implementations, the transmitter 356 may be configured to transmit signaling, control information, and data to the base station 105, and the receiver 358 may be configured to receive signaling, control information, and data from the base station 105.

In some implementations, one or more of the transmitter 306, the receiver 308, the transmitter 356, or the receiver 358 may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, the wireless communication system 300 operates in accordance with a 5G NR network. For example, the wireless communication system 300 may include multiple 5G-capable UEs 115 and multiple 5G-capable base stations 105, such as UEs and base stations configured to operate in accordance with a 5G NR network protocol such as that defined by the 3GPP.

In some examples, one or more UEs 115 may be associated with a particular capability type. In some examples, the UEs 115x and 115z are associated with a first capability type, and the UE 115y is associated with a second capability type different than the first capability type. In some implementations, first capability type may correspond to a "reduced capability" (RedCap) capability type, and the second capability type may correspond to a non-RedCap capability type, such as an embedded mobile broadband (eMBB) capability type, an ultra-reliable low-latency communication (URLLC) capability type, or another capability type. In some examples, the UE 115x and the UE 115z may correspond to wearable devices, medical monitoring devices, sensor devices, Internet-of-Things (IoT) devices, or smart city devices (such as surveillance cameras), as illustrative examples.

To further illustrate, in some implementations, the UE 115x, the UE 115y, and the UE 115z may communicate with the base station 105 using a first uplink bandwidth part (BWP) 362 (e.g., a default uplink BWP of the UE 115x), a second uplink BWP 372, and a third uplink BWP 382, respectively. In some examples, the first uplink BWP 362 and the third uplink BWP 382 include less bandwidth than the second uplink BWP 372 (e.g., to reduce power consumption associated with the UE 115x and the UE 115z). Each of the uplink BWPs 362, 372, and 382 may correspond to an initial uplink BWP or an active uplink BWP. To illustrate, the first uplink BWP 362 may correspond to an initial uplink BWP used by the UE 115x prior to establishing a radio resource control (RRC) connection between the base station 105 and the UE 115x. In some other examples, the first uplink BWP 362 may correspond to an active uplink BWP that is configured by the base station 105 after establishing the RRC connection between the base station 105 and the UE 115x.

During operation, the transmitter 356 may operate based on the first uplink BWP 362. For example, the transmitter 356 may be configured to transmit, to the base station 105, an uplink control channel transmission 330 that is within the first uplink BWP 362 (e.g., where the uplink control channel transmission 330 is transmitted using frequency resources that are included in the first uplink BWP 362). The uplink control channel transmission 330 may indicate uplink control information (UCI) 334 associated with the UE 115x. In some examples, the uplink control channel transmission 330 corresponds to a physical uplink control channel (PUCCH) transmission.

In some implementations, the transmitter 356 may be configured to perform the uplink control channel transmission 330 based on a FH mode 360. During operation based on the FH mode 360, the transmitter 356 may change (or "hop") between transmitting using a first frequency subset 364 of the first uplink BWP 362 and a second frequency subset 366 of the first uplink BWP 362. In some circumstances, performing the uplink control channel transmission 330 based on a FH mode 360 may be associated with reduced performance of one or more other UEs 115, such as resource fragmentation.

Figure 4:
FIG. 4 is a diagram illustrating an example of a resource allocation scheme according to some aspects of the disclosure.
Figure 4:
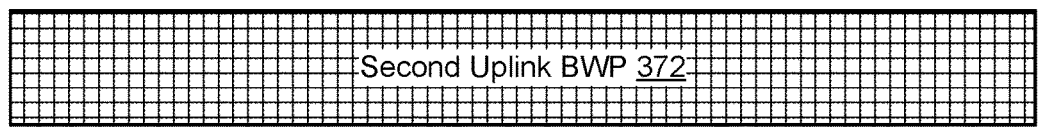

To illustrate, FIG. 4 is a diagram illustrating an example of a resource allocation scheme 400 according to some aspects of the disclosure. In the example of the resource allocation scheme 400, the first uplink BWP 362 is less than (e.g., includes a smaller frequency range than) the second uplink BWP 372. During operation of the transmitter 356 based on the FH mode 360, the UE 115y may experience resource fragmentation. For example, if the transmitter 356 uses the first frequency subset 364 and the second frequency subset 366 during the FH mode 360, frequencies corresponding to the first frequency subset 364 and the second frequency subset 366 may be unavailable to (or may be unassigned to) the UE 115y. As a result, resources of the second uplink BWP 372 may be separated (or fragmented) into three non-contiguous frequency ranges.

In some aspects of the disclosure, the base station 105 may transmit the FH indicator 150 to selectively enable or disable the FH mode 360. Disabling the FH mode 360 may reduce or avoid resource fragmentation of the second uplink BWP 372. For example, when the FH mode 360 is disabled, the UE 115x may perform the uplink control channel transmission 330 based on one (but not both) of the first frequency subset 364 or the second frequency subset 366, which may reduce or avoid fragmentation of the second uplink BWP 372.

To further illustrate, referring again to FIG. 3, the base station 105 may transmit one or more messages 320 to the UE 115x including the FH indicator 150. In some examples, the UE 115x transmits a message 310 to the base station 105 indicating a capability type 314 of the UE 115x, and the base station 105 transmits the FH indicator 150 to the UE 115x based on the capability type 314. In some examples, the capability type 314 indicates that the UE 115x corresponds to a RedCap UE. In such examples, the capability type 314 may correspond to a RedCap capability type, which may be associated with a reduced uplink bandwidth as compared to at least one other capability type, such as an eMBB capability type or a URLLC capability type in some implementations.

Alternatively or in addition, the capability type 314 may indicate one or more other parameters, such as one or more of a bandwidth or a center frequency of the first uplink BWP 362, as an illustrative example.

In some examples, the message 310 corresponds to a message of type one (msg1) associated with a four-step random access channel (RACH) procedure 342 (e.g., a contention-based RACH procedure) that indicates the capability type 314. In some such examples, the one or more messages 320 may include or correspond to one of a message of type four (msg4) associated with the four-step RACH procedure 342, a downlink control channel transmission scheduling the msg4, or a combination of a downlink control channel transmission and a downlink data channel transmission. In connection with the combination of the downlink control channel transmission and the downlink data channel transmission, at least a first bit of the FH indicator 150 is included in the downlink control channel transmission, and at least a second bit of the FH indicator 150 is included in the downlink data channel transmission. In such examples, the UE 115*x* may perform joint decoding or joint processing of the downlink control channel transmission and the downlink data channel transmission to identify the FH indicator 150, which may increase reliability of transmission of the FH indicator 150 in some circumstances.

In some other examples, the message 310 corresponds to a message of type three (msg3) associated with the four-step RACH procedure 342 and having one of a demodulation reference signal (DMRS) configuration indicating the capability type 314, a payload indicating the capability type 314, or a scrambling identifier indicating the capability type 314. In some such examples, the one or more messages 320 may include or correspond to one of a message four (msg4) associated with the four-step RACH procedure 342, a downlink control channel transmission scheduling the msg4, or a combination of a downlink control channel transmission and a downlink data channel transmission.

In some other examples, the message 310 corresponds to a message of type A (msgA) associated with a two-step RACH procedure 344 (e.g., a contention-free RACH procedure) and having one of a preamble indicating the capability type 314, a DMRS configuration indicating the capability type 314, a payload indicating the capability type 314, or a scrambling identifier of the payload indicating the capability type 314. In some such examples, the one or more messages 320 may include or correspond to one of a message of type B (msgB) associated with the two-step RACH procedure 344, a downlink control channel message scheduling the msgB, or a combination of a downlink control channel transmission and a downlink data channel transmission.

To further illustrate, in an example of the four-step RACH procedure 342, the UE 115*x* may transmit the msg1 to indicate a random access preamble selected by the UE 115*x*, and the base station 105 may transmit the msg2 to indicate a response to the random access preamble that includes an uplink resource allocation. The UE 115*x* may transmit the msg3 to the base station 105 using the uplink resource allocation, and the base station 105 may transmit a contention resolution message to the UE 115*x* via the msg4. In an example of the two-step RACH procedure 344, the base station 105 may assign a random access preamble to the UE 115*x* and may indicate the assigned random access preamble to the UE 115*x*. The UE 115*x* may transmit the assigned random access preamble to the base station 105 via the msgA, and the base station 105 may transmit a random access response to the msgA to the UE 115*x* via the msgB.

In some other examples, the one or more messages 320 may include or correspond to another message that is transmitted irrespective of a RACH type associated with the UE 115*x*. For example, the one or more messages 320 may include or correspond to a system information (SI) message associated with the base station 105. In some examples, the base station 105 transmits the SI message using a broadcast technique, which may enable reception of the SI message by multiple UEs (such as the UEs 115*x-z*).

The FH indicator 150 may include a bit 324 having a value indicating whether the FH mode 360 is enabled or disabled. To illustrate, the bit 324 may indicate a first value, and the transmitter 356 may perform the uplink control channel transmission 330 using the FH mode 360 based on the first value of the bit 324. In some other examples, the bit 324 may indicate a second value different than the first value, and the transmitter may disable the FH mode 360 for the uplink control channel transmission 330 based on the second value of the bit 324. In such examples, the transmitter 356 may perform the uplink control channel transmission 330 using one (but not both) of the first frequency subset 364 or the second frequency subset 366. In some implementations, the first value corresponds to a logic zero value, and the second value corresponds to a logic one value. In some other implementations, the first value corresponds to a logic one value, and the second value corresponds to a logic zero value.

In some implementations, the FH indicator 150 may optionally include a first group of one or more bits 326 indicating a resource set 346 within the first uplink BWP 362. For example, the memory 282 may store a table of resource sets, and the first group of one or more bits 326 may correspond to an index to the table of resource sets. The processor 280 may identify the resource set 346 based on the first group of one or more bits 326, and the transmitter 356 may perform the uplink control channel transmission 330 based on the resource set 374. In some examples, the first group of one or more bits 326 may indicate the first frequency subset 364, the second frequency subset 366, or other frequency resources included in the first uplink BWP 362.

In some examples, at least a subset of the resource set 346 is shared or partially overlapping with at least one other resource set of at least one other device having a same or different capability type as the UE 115*x*. For example, the resource set 346 may include at least one common resource as a resource set 374 of the UE 115*y*, and the UE 115*y* may have a different capability type as the UE 115*x*. As another example, the resource set 346 may include at least one common resource as a resource set 384 of the UE 115*z*, and the UE 115*z* may have a same capability type as the UE 115*x*. In some examples, the resource set 374 may correspond to an initial uplink BWP or active uplink BWP of the UE 115*y*, and the resource set 384 may correspond to an initial uplink BWP or active uplink BWP of the UE 115*z*.

In some other examples, the resource set 346 is separate from one or more other resource sets of at least one other device having a same or different capability type as the UE 115*x*. For example, the resource set 346 may be separate from (and may not include at least one common resource as) the resource set 374 of the UE 115*y*, and the UE 115*y* may have a different capability type as the UE 115*x*. As another example, the resource set 346 may be separate from the resource set 384 of the UE 115*z*, and the UE 115*z* may have a same capability type as the UE 115*x*.

Alternatively or in addition, the FH indicator 150 may optionally include a second group of one or more bits 328 indicating a repetition number 348, and the transmitter 356 may perform one or more repetitions 332 of the uplink control channel transmission 330 based on the repetition number 348. In some examples, performing the one or more repetitions 332 may increase reliability associated with the uplink control channel transmission 330. To illustrate, disabling the FH mode 360 may reduce a frequency diversity gain associated with the uplink control channel transmission 330, and performing the one or more repetitions 332 may compensate for the reduced frequency diversity gain (e.g., by increasing a time diversity gain associated with the uplink control channel transmission 330).

In some examples, the base station 105 transmits the one or more messages 320 using a broadcast transmission technique. Depending on the particular example, the base station 105 may transmit the one or more messages 320 (e.g., using the broadcast transmission technique) prior to or after an initial access procedure by the UE 115x. The initial access procedure may include establishing an RRC connection between the base station 105 and the UE 115. In some other examples, the base station 105 transmits the one or more messages 320 using a unicast transmission technique. Depending on the particular example, the base station 105 may transmit the one or more messages 320 using the unicast transmission technique and using one of an RRC connection or medium access control (MAC) control element (MAC-CE) signaling.

Although some examples of the uplink control channel transmission 330 may be described as a single signal or single transmission, in some other examples, the uplink control channel transmission 330 may include multiple uplink signals within the first uplink BWP 362. In such examples, bits of the UCI 334 may be allocated (or "shared") among the multiple uplink signals within the first uplink BWP 362. Further, the FH indicator 150 may be shared among the multiple uplink signals (e.g., by enabling or disabling the FH mode 360 for each of the multiple uplink signals based on the value of the bit 324). In some examples, the multiple uplink signals include one or more of a physical uplink control channel (PUCCH) signal, a physical uplink shared channel (PUSCH) signal, a sounding reference signal (SRS), or a physical random access channel (PRACH) signal, as illustrative examples.

Figure 5:
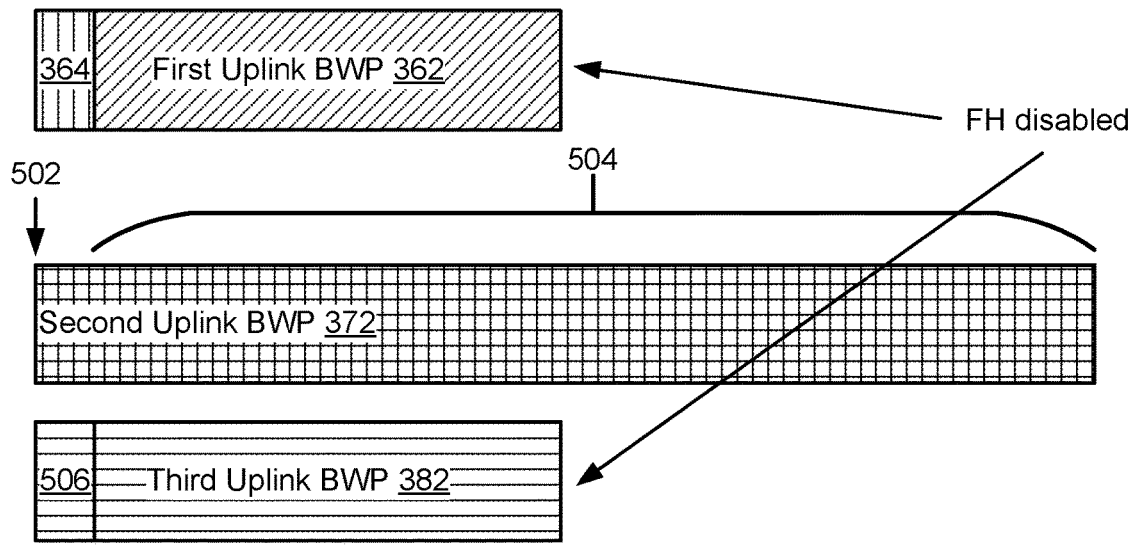
FIG. 5 is a diagram illustrating examples of the first uplink bandwidth part (BWP), a second uplink BWP, and a third uplink BWP according to some aspects of the disclosure.

FIG. 5 is a diagram illustrating examples of the first uplink BWP 362, the second uplink BWP 372, and the third uplink BWP 382 according to some aspects of the disclosure. FIG. 5 illustrates that the first frequency subset 364 of the first uplink BWP 362 may be aligned with a first boundary 502 of the second uplink BWP 372 (e.g., a lowest frequency included in the second uplink BWP 372).

Aligning the first frequency subset 364 and the first boundary 502 of the second uplink BWP 372 may reduce or avoid resource fragmentation of the second uplink BWP 372 during operation of the transmitter 356 based on the FH mode 360. For example, if resources of the first frequency subset 364 are unavailable to the UE 115y during the uplink control channel transmission 330, then a contiguous group of resources 504 may be available to the UE 115y (e.g., instead of multiple non-contiguous groups of resources that may result from resource fragmentation). In some examples, by reducing or avoiding resource fragmentation may reduce a number of packets transmitted by the UE 115y (e.g., by enabling data to be transmitted in a single packet using the contiguous group of resources 504 instead of using multiple packets using multiple non-contiguous groups of resources). As a result, data throughput and performance may be improved.

The example of FIG. 5 also illustrates that the first frequency subset 364 may be aligned a third frequency subset 506 of the third uplink BWP 382 associated with a third device (e.g., the UE 115z). As a result, resource fragmentation to the second uplink BWP 372 due to transmissions by the UE 115z that use the third frequency subset 506 may be reduced or avoided.

Figure 6:
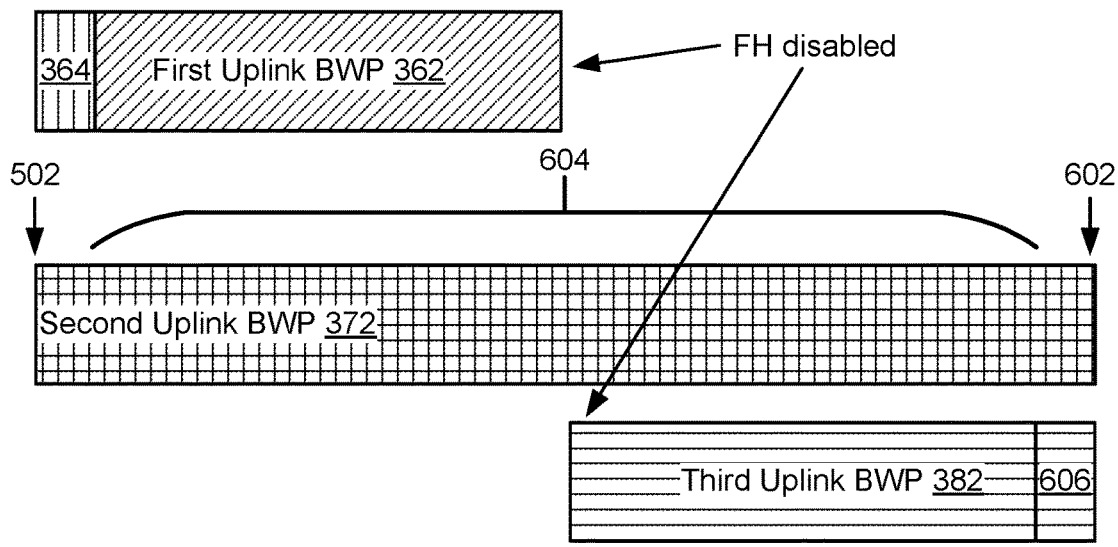
FIG. 6 is a diagram illustrating additional examples of the first uplink BWP, the second uplink BWP, and the third uplink BWP according to some aspects of the disclosure.

FIG. 6 is a diagram illustrating additional examples of the first uplink BWP 362, the second uplink BWP 372, and the third uplink BWP 382 according to some aspects of the disclosure. FIG. 6 illustrates that a second boundary 602 of the second uplink BWP 372 may be aligned with a fourth frequency subset 606 of the third uplink BWP 382 associated with a third device (e.g., the UE 115z). In some implementations, the example of FIG. 6 may reduce interference between transmissions of the UE 115x and the UE 115y (due to use of different frequency subsets 364, 606 for the transmissions) while also enabling a contiguous group of resources 604 for the UE 115y, thus reducing or avoiding resource fragmentation to the UE 115y.

Referring again to FIG. 3, in some examples, the base station 105 sets the FH indicator 150 based on a resource allocation 302. The resource allocation 302 may track or indicate resources allocated to UEs of the wireless communication system 300, such as the UEs 115x-z. As an illustrative example, if the first uplink BWP 362 is included in the second uplink BWP 372, the base station 105 may set the FH indicator 150 to indicate disabling of the FH mode 360 and may optionally indicate use of resources of the second frequency subset 366 via the first group of one or more bits 326. Alternatively or in addition, the base station 105 may perform alignment of uplink BWPs based on the resource allocation 302, such as by aligning the frequency subsets 364, 506 with the first boundary 502, or by aligning the first frequency subset 364 with the first boundary 502 and aligning the fourth frequency subset 606 with the second boundary 602.

Although certain examples have been described with reference to an explicit FH indication technique (such as using the bit 324), in some other examples, a UE 115 may determine whether FH is to be performed in accordance with an implicit FH indication technique. An implicit FH indication technique may be used alternatively or in addition to an explicit FH indication technique. For example, in some implementations, if the UE 115x fails to receive an explicit indication of the FH indicator 150 from the base station 105, then the UE 115x may determine whether to enable or disable the FH mode 360 using an implicit FH indication technique. Examples of an implicit FH indication technique are described further with reference to FIG. 7.

Figure 7:
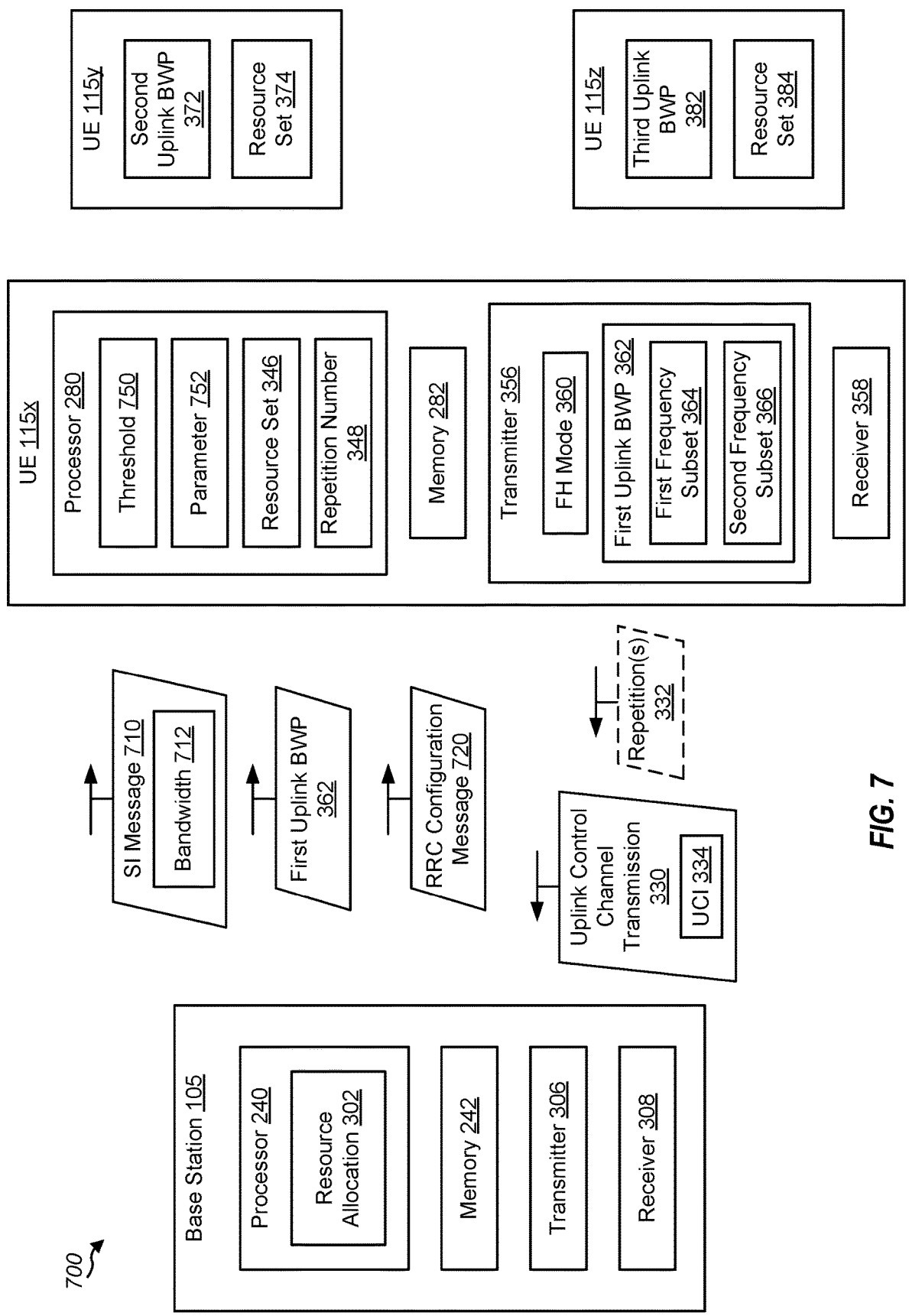
FIG. 7 is a block diagram illustrating another example of a wireless communication system according to some aspects of the disclosure.

FIG. 7 is a block diagram illustrating another example of a wireless communication system 700 according to some aspects of the disclosure. The wireless communication system 700 may include one or more base stations, such as the base station 105. The wireless communication system 300 may further include one or more UEs, such as a UE 115x, UE 115y, and a UE 115z.

During operation, the base station 105 may transmit an indication of a bandwidth 712 associated with the base station 105, such as a serving cell system bandwidth associated with the base station 105. In some examples, the base station 105 may transmit a system information (SI) message 710 that includes the first indication of the bandwidth 712. The base station 105 may transmit the first indication of the bandwidth 712 using a broadcast transmission technique.

One or more of the UEs 115x-z may receive the first indication of the bandwidth 712 and may decode the first indication to identify the bandwidth 712. For example, the UE 115x may receive the SI message 710 and may decode the SI message 710 to identify the bandwidth 712.

The base station 105 may transmit a second indication of the first uplink BWP 362 associated with the UE 115x. In some examples, the second indication of the first uplink BWP 362 is included in the SI message 710. In some such examples, the UE 115x may decode the SI message 710 to identify the first uplink BWP 362. In some other examples, the second indication of the first uplink BWP 362 is included in an RRC configuration message 720 transmitted by the base station 105 to the UE 115x after establishing an RRC connection with the UE 115x. In some such examples, the UE 115x may decode the RRC configuration message 720 to identify the first uplink BWP 362. In some other examples, the second indication of the first uplink BWP 362 may be included in another message. Depending on the particular example, the first uplink BWP 362 may correspond to an initial BWP of the UE 115x or an active BWP of the UE 115x.

In some aspects of the disclosure, the UE 115x may determine whether the first uplink BWP 362 exceeds a threshold 750. For example, the processor 280 may compare a first number of hertz (Hz) corresponding to the first uplink BWP 362 to a second number of Hz corresponding to the threshold 750 to determine whether the first uplink BWP 362 exceeds the threshold 750. The threshold 750 may be based at least in part on the bandwidth 712.

The UE 115x may enable (or disable) the FH mode 360 based on whether the first uplink BWP 362 exceeds (or fails to exceed) the threshold 750. To illustrate, in some examples, the processor 280 may determine that the first uplink BWP 362 exceeds the threshold 750. In such examples, the processor 280 may enable the FH mode 360, and the transmitter 356 may perform the uplink control channel transmission 330 based on the FH mode 360. In some other examples, the processor 280 may determine that the first uplink BWP 362 fails to exceed the threshold 750. In such examples, the processor 280 may disable the FH mode 360, and the transmitter 356 may perform the uplink control channel transmission 330 without using the FH mode 360.

In some implementations, the threshold 750 is based on the bandwidth 712 and a parameter 752 (e.g., a coefficient having a positive, or non-negative, value). In some examples, the threshold 750 corresponds to a product of the bandwidth 712 and the parameter 752. In some implementations, the parameter 752 is determined by a network device (e.g., the base station 105) and is indicated to the UE 115x in system information (e.g., via the SI message 710) or using RRC signaling (e.g., via the RRC configuration message 720, or via another message). In some other examples, the base station 105 and the UE 115x operate in accordance with a wireless communication protocol (such as a 5G NR wireless communication protocol), and the wireless communication protocol specifies the parameter 752 based on one or more of the bandwidth 712, a maximum bandwidth associated with a device type (e.g., a maximum bandwidth supported by the capability type 314 of FIG. 3), or the first uplink BWP 362 configured by a network device based on the device type.

In some examples, one or more of the first frequency subset 364 or the second frequency subset 366 includes a first contiguous group of one or more physical resource blocks (PRBs). As a non-limiting illustrative example, the first frequency subset 364 may include a contiguous group of two contiguous PRBs, and the second frequency subset 366 may include a contiguous group of three contiguous PRBs.

In some examples, one or more of the first frequency subset 364 or the second frequency subset 366 spans either a second contiguous group of symbols within a slot or a third contiguous group of symbols within multiple slots. To illustrate, if one or more of the first frequency subset 364 or the second frequency subset 366 spans a contiguous group of symbols within a slot, the FH mode 360 may correspond to or may be referred to as an intra-slot frequency hopping mode. If one or more of the first frequency subset 364 or the second frequency subset 366 spans a contiguous group of symbols within multiple slots, the FH mode 360 may correspond to or may be referred to as an inter-slot frequency hopping mode.

In some examples, the first frequency subset 364 does not overlap the second frequency subset 366. For example, PRBs of the first frequency subset 364 may not overlap (and may not be included in) PRBs of the second frequency subset 366 when the FH mode 360 is enabled for the uplink control channel transmission 330 in the first uplink BWP 362.

One or more examples described herein may improve performance of one or more UEs, such as the UE 115y. For example, by disabling the FH mode 360 in one or more cases in which the first uplink BWP 362 is included in the second uplink BWP 372, resource fragmentation associated with the second uplink BWP 372 may be reduced or avoided. As a result, a number of packets used by the UE 115y to transmit data to the base station 105 may be reduced, which may decrease latency in some circumstances.

Figure 8:
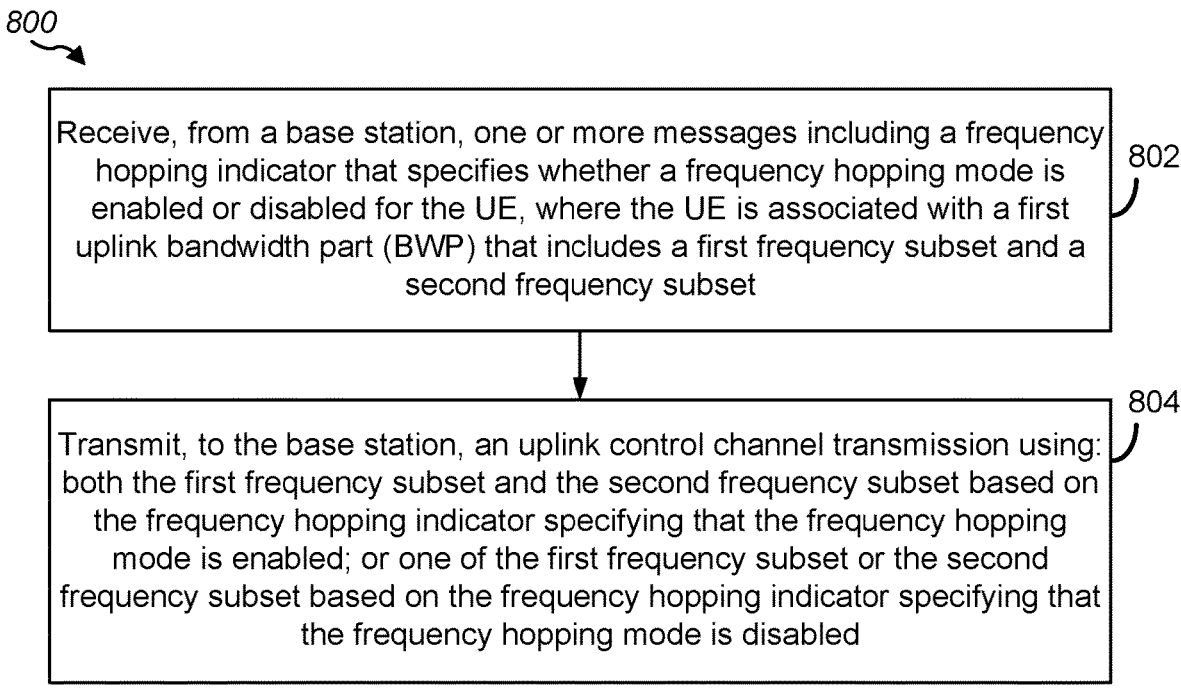
FIG. 8 is a flow diagram illustrating an example of a method of wireless communication performed by a UE according to some aspects of the disclosure.

FIG. 8 is a flow chart illustrating an example of a method 800 of wireless communication performed by a UE according to some aspects. In some examples, the method 800 is performed by the UE 115.

The method 800 includes receiving, from a base station, one or more messages including a frequency hopping indicator that specifies whether a frequency hopping mode is enabled or disabled for the UE, at 802. The UE is associated with a first uplink BWP that includes a first frequency subset and a second frequency subset. For example, the UE 115x may receive the FH indicator 150 (e.g., using the receiver 358) indicating whether the FH mode 360 is enabled or disabled for the UE 115x.

The method 800 further includes transmitting, to the base station, an uplink control channel transmission, at 804. The uplink control channel transmission is transmitted using both the first frequency subset and the second frequency subset based on the frequency hopping indicator specifying that the frequency hopping mode is enabled or using one of the first frequency subset or the second frequency subset based on the frequency hopping indicator specifying that the frequency hopping mode is disabled. For example, based on the FH indicator 150 indicating that the FH mode 360 is enabled, the UE 115x may perform the uplink control channel transmission 330 (e.g., using the transmitter 356) using both the first frequency subset 364 and the second frequency subset 366, such as by changing (or "hopping") between transmitting using the first frequency subset 364 and the second frequency subset 366. In some other examples, based on the FH indicator 150 indicating that the FH mode 360 is disabled, the UE 115x may perform the uplink control channel transmission 330 (e.g., using the transmitter 356) using one (but not both) of the first frequency subset 364 or the second frequency subset 366.

Figure 9:
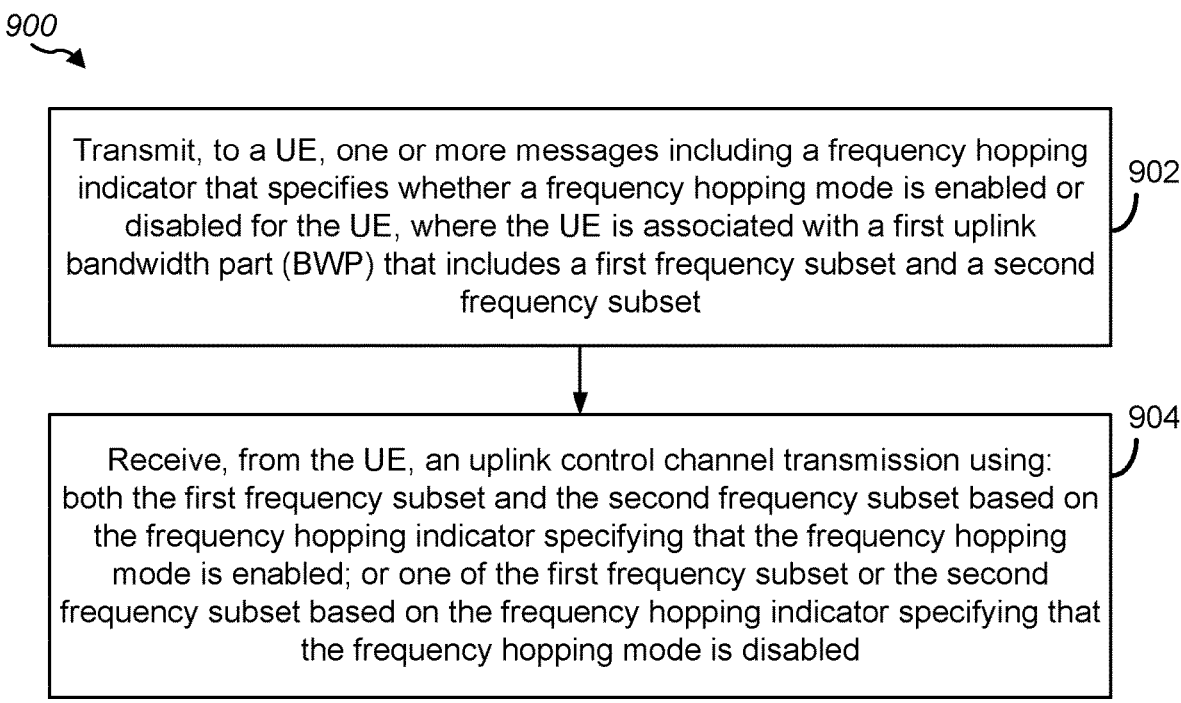
FIG. 9 is a flow diagram illustrating an example of a method of wireless communication performed by a base station according to some aspects of the disclosure.

FIG. 9 is a flow chart illustrating an example of a method 900 of wireless communication performed by a base station according to some aspects. In some examples, the method 900 is performed by the base station 105.

The method 900 includes transmitting, to a UE, one or more messages including a frequency hopping indicator that specifies whether a frequency hopping mode is enabled or disabled for the UE, at 902. The UE is associated with a first uplink BWP that includes a first frequency subset and a second frequency subset. For example, the base station 105 may transmit the FH indicator 150 (e.g., using the transmitter 306) indicating whether the FH mode 360 is enabled or disabled for the UE 115x.

The method 900 further includes receiving, from the UE, an uplink control channel transmission, at 904. The uplink control channel transmission is received using both the first frequency subset and the second frequency subset based on the frequency hopping indicator specifying that the frequency hopping mode is enabled or using one of the first frequency subset or the second frequency subset based on the frequency hopping indicator specifying that the frequency hopping mode is disabled. For example, based on the FH indicator 150 indicating that the FH mode 360 is enabled, the base station 105 may receive the uplink control channel transmission 330 (e.g., using the receiver 308) using both the first frequency subset 364 and the second frequency subset 366, such as by changing (or "hopping") between receiving using the first frequency subset 364 and the second frequency subset 366. In some other examples, based on the FH indicator 150 indicating that the FH mode 360 is disabled, the base station 105 may receive the uplink control channel transmission 330 (e.g., using the receiver 308) using one (but not both) of the first frequency subset 364 or the second frequency subset 366.

Figure 10:
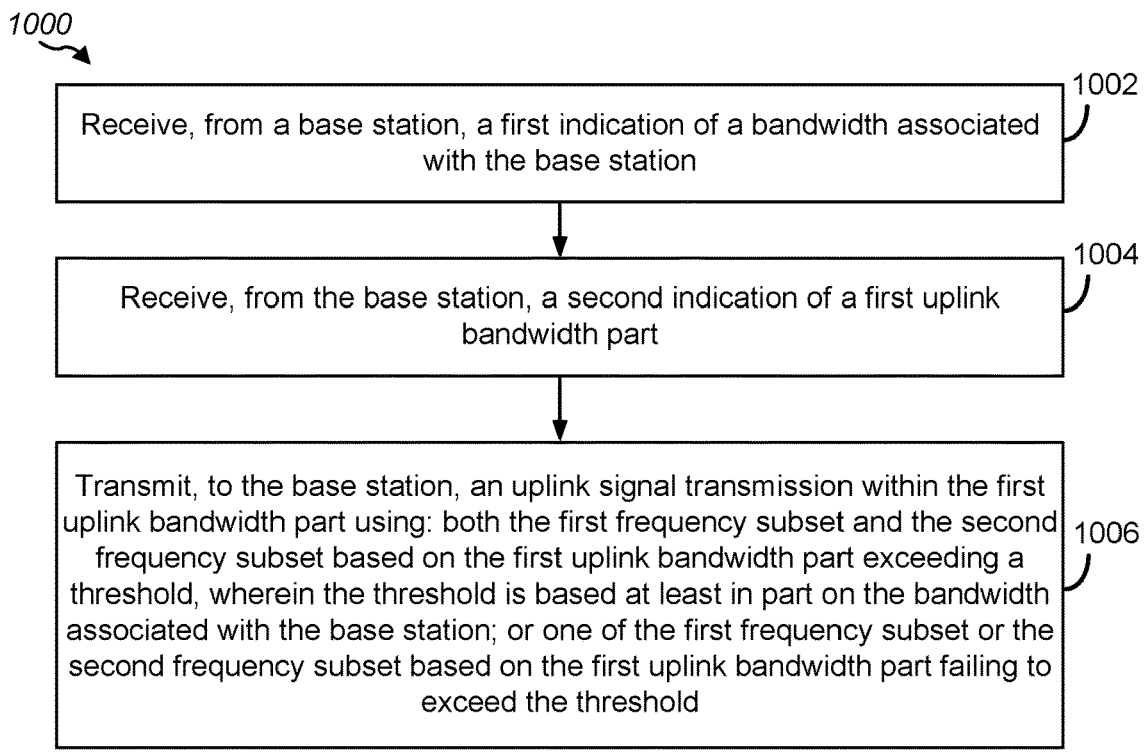
FIG. 10 is a flow diagram illustrating another example of a method of wireless communication performed by a UE according to some aspects of the disclosure.

FIG. 10 is a flow chart illustrating an example of a method 1000 of wireless communication performed by a UE according to some aspects. In some examples, the method 1000 is performed by the UE 115.

The method 1000 includes receiving, from a base station, a first indication of a bandwidth associated with the base station, at 1002.

The method 1000 further includes receiving, from the base station, a second indication of a first uplink BWP, at 1004. The first uplink BWP includes a first frequency subset and that further includes a second frequency subset.

The method 1000 further includes transmitting, to the base station, an uplink signal transmission, at 1006. The uplink signal transmission is transmitted using both the first frequency subset and the second frequency subset based on the first uplink BWP exceeding a threshold that is based at least in part on the bandwidth associated with the base station or using one of the first frequency subset or the second frequency subset based on the first uplink BWP failing to exceed the threshold.

Figure 11:
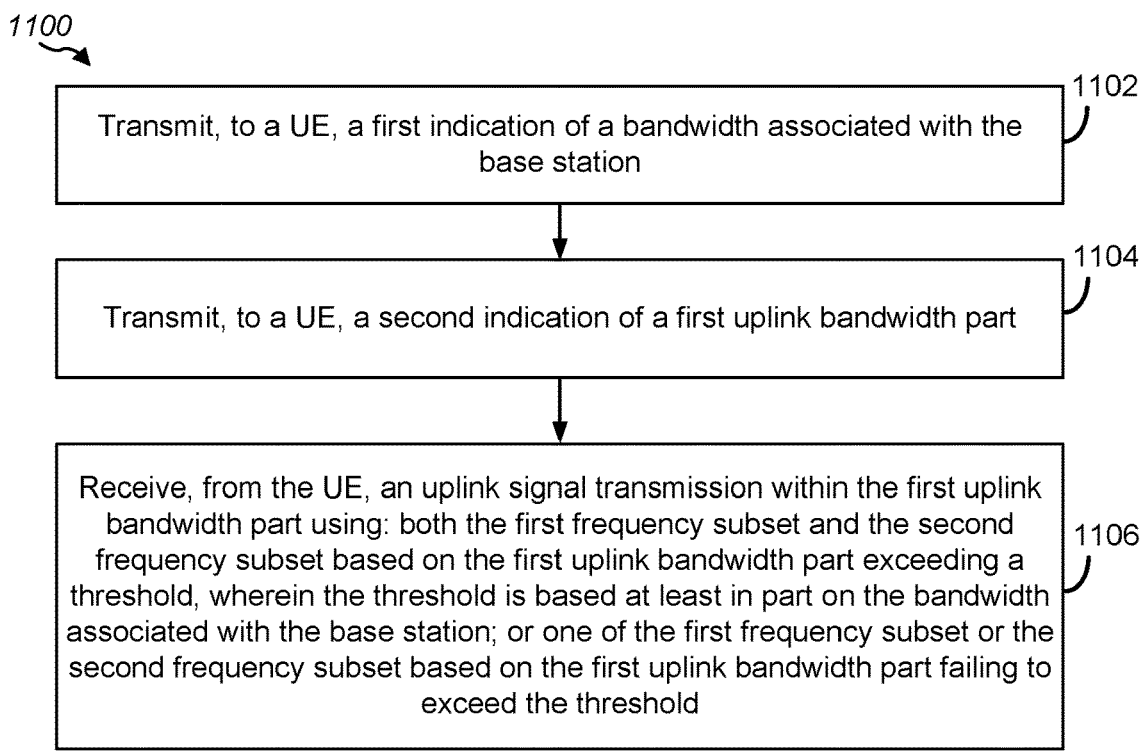
FIG. 11 is a flow diagram illustrating an example of a method of wireless communication performed by a base station according to some aspects of the disclosure.

FIG. 11 is a flow chart illustrating an example of a method 1100 of wireless communication performed by a base station according to some aspects. In some examples, the method 1100 is performed by the base station 105.

The method 1100 includes transmitting, to a UE, a first indication of a bandwidth associated with the base station, at 1102.

The method 1100 further includes transmitting, to the UE, a second indication of a first uplink BWP, at 1104. The first uplink BWP includes a first frequency subset and that further includes a second frequency subset.

The method 1100 further includes receiving, from the UE, an uplink signal transmission, at 1106. The uplink signal transmission is received using both the first frequency subset and the second frequency subset based on the first uplink BWP exceeding a threshold that is based at least in part on the bandwidth associated with the base station or using one of the first frequency subset or the second frequency subset based on the first uplink BWP failing to exceed the threshold.

Figure 12:
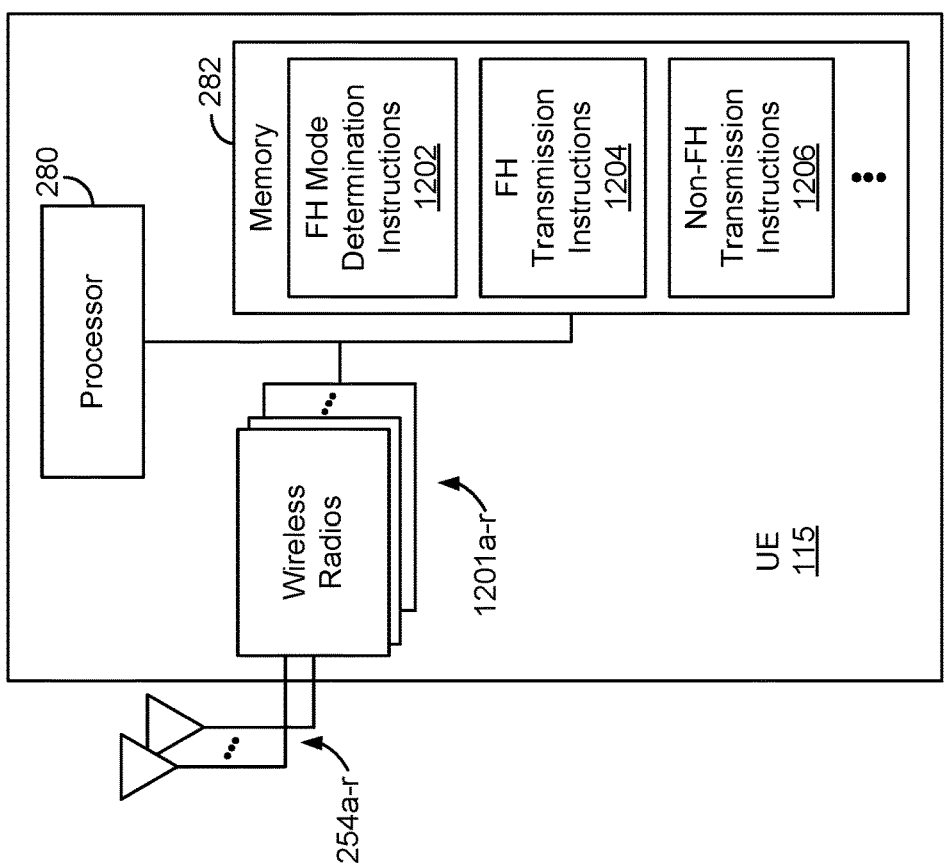
FIG. 12 is a block diagram illustrating an example of a UE according to some aspects of the disclosure.

FIG. 12 is a block diagram illustrating an example of the UE 115 according to some aspects of the disclosure. The UE 115 may include structure, hardware, or components illustrated in FIG. 2. For example, the UE 115 may include the processor 280, which may execute instructions stored in the memory 282. Using the processor 280, the UE 115 may transmit and receive signals via wireless radios 1201a-r and antennas 252a-r. The wireless radios 1201a-r may include one or more components or devices described herein, such as one or more of the modulator/demodulators 254a-r, the MIMO detector 256, the receive processor 258, the transmit processor 264, the TX MIMO processor 266, the transmitter 356, the receiver 358, or one or more other components or devices.

In some implementations, the memory 282 may store FH mode determination instructions 1202 executable by the processor 280 to identify whether the FH mode 360 is to be enabled or disabled (e.g., based on the value of the bit 324 of the FH indicator 150). The memory 282 may store FH transmission instructions 1204 executable by the processor 280 to perform the uplink control channel transmission 330 using the FH mode 360 based on the FH indicator 150 specifying that the FH mode 360 is to be enabled. The memory 282 may store non-FH transmission instructions 1206 executable by the processor 280 to perform the uplink control channel transmission 330 without using the FH mode 360 based on the FH indicator 150 specifying that the FH mode 360 is to be disabled.

Figure 13:
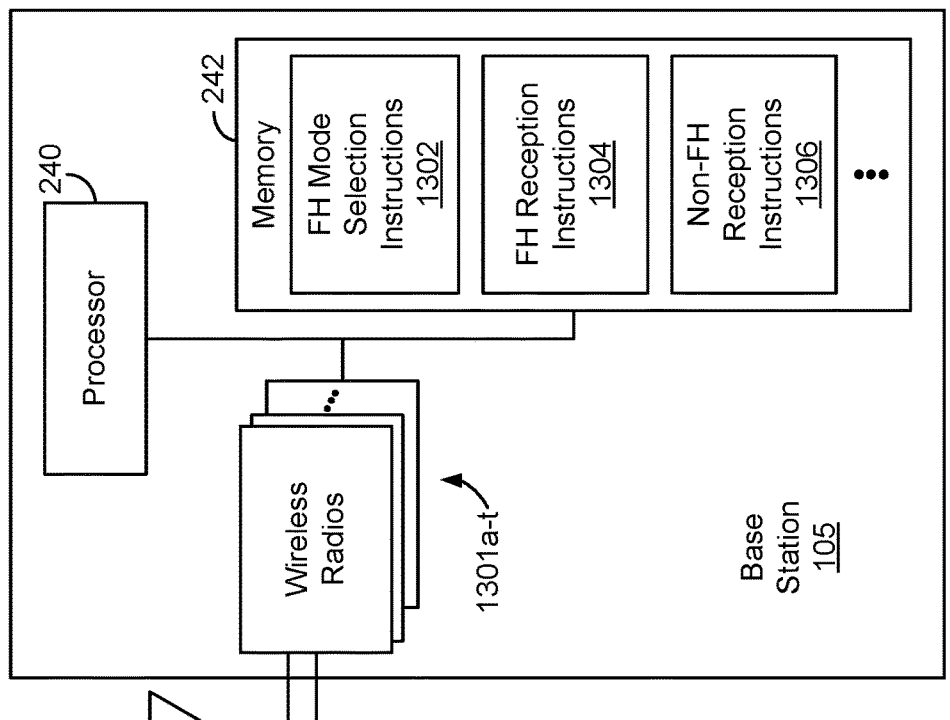
FIG. 13 is a block diagram illustrating an example of a base station according to some aspects of the disclosure.

FIG. 13 is a block diagram illustrating an example of the base station 105 according to some aspects of the disclosure. The base station 105 may include structure, hardware, and components illustrated in FIG. 2. For example, the base station 105 may include the processor 240, which may execute instructions stored in the memory 242. Under control of the processor 240, the base station 105 may transmit and receive signals via wireless radios 1301a-t and antennas 234a-t. The wireless radios 1301a-t may include one or more components or devices described herein, such as one or more of the modulator/demodulators 232a-t, the MIMO detector 236, the receive processor 238, the transmit processor 220, the TX MIMO processor 230, the transmitter 306, the receiver 308, or one or more other components or devices.

In some implementations, the memory 242 may store FH mode determination instructions 1302 executable by the processor 240 to select whether the FH mode 360 is to be enabled or disabled (e.g., by setting the value of the bit 324 of the FH indicator 150, which may be based on the resource allocation 302). The memory 242 may store FH reception instructions 1304 executable by the processor 240 to receive the uplink control channel transmission 330 based on the FH mode 360 in response to the FH indicator 150 specifying that the FH mode 360 is to be enabled. The memory 242 may store non-FH reception instructions 1306 executable by the processor 240 to receive the uplink control channel transmission 330 without using the FH mode 360 in response to the FH indicator 150 specifying that the FH mode 360 is to be disabled.

To further illustrate some aspects of the disclosure, in a first aspect, an apparatus for wireless communication includes a transmitter configured to communicate with a base station based on a first uplink bandwidth part (BWP) that includes a first frequency subset and that further includes a second frequency subset. The apparatus further includes a receiver configured to receive, from the base station, one or more messages including a frequency hopping indicator that specifies whether a frequency hopping mode is enabled or disabled. The transmitter is further configured to transmit, to the base station, an uplink control channel transmission using: both the first frequency subset and the second frequency subset based on the frequency hopping indicator specifying that the frequency hopping mode is enabled; or one of the first frequency subset or the second frequency subset based on the frequency hopping indicator specifying that the frequency hopping mode is disabled.

In a second aspect, alone or in combination with the first aspect, the first uplink BWP corresponds to a default uplink BWP of the apparatus.

In a third aspect, alone or in combination with one or more of the first aspect or the second aspect, the transmitter is further configured to transmit a message indicating a capability type of the apparatus, and wherein the frequency hopping indicator is based on the capability type.

In a fourth aspect, alone or in combination with one or more of the first aspect through the third aspect, the capability type corresponds to a reduced capability (RedCap) capability type that is associated with a reduced uplink bandwidth as compared to at least one other capability type.

In a fifth aspect, alone or in combination with one or more of the first aspect through the fourth aspect, the transmitter is further configured to transmit a message of type one (msg1) associated with a four-step random access channel (RACH) procedure and that indicates a capability type of the apparatus, the one or more messages are received based on the capability type, and the one or more messages include one of a message of type four (msg4) associated with the four-step RACH procedure, a downlink control channel transmission scheduling the msg4, or a combination of a downlink control channel transmission and a downlink data channel transmission.

In a sixth aspect, alone or in combination with one or more of the first aspect through the fifth aspect, the transmitter is further configured to transmit a message of type three (msg3) associated with a four-step random access channel (RACH) procedure, one of a demodulation reference signal (DMRS) configuration of the msg3, a payload of the msg3, or a scrambling identifier of the msg3 indicates a capability type of the apparatus, the one or more messages are received based on the capability type, and the one or more messages include one of a message four (msg4) associated with the four-step RACH procedure, a downlink control channel transmission scheduling the msg4, or a combination of a downlink control channel transmission and a downlink data channel transmission.

In a seventh aspect, alone or in combination with one or more of the first aspect through the sixth aspect, the transmitter is further configured to transmit a message of type A (msgA) associated with a two-step random access channel (RACH) procedure, one of a preamble of the msgA, a demodulation reference signal (DMRS) configuration of the msgA, a payload of the msgA, or a scrambling identifier of the payload indicates a capability type of the apparatus, and the one or more messages are received based on the capability type.

In an eighth aspect, alone or in combination with one or more of the first aspect through the seventh aspect, the one or more messages include one of a message of type B (msgB) associated with the two-step RACH procedure, a downlink control channel message scheduling the msgB, or a combination of a downlink control channel transmission and a downlink data channel transmission.

In a ninth aspect, alone or in combination with one or more of the first aspect through the eighth aspect, the one or more messages include a system information (SI) message associated with the base station.

In a tenth aspect, alone or in combination with one or more of the first aspect through the ninth aspect, the frequency hopping indicator includes a bit, and the transmitter is further configured to perform the uplink control channel transmission using the frequency hopping mode based on a first value of the bit.

In an eleventh aspect, alone or in combination with one or more of the first aspect through the tenth aspect, the transmitter is further configured to disable the frequency hopping mode for the uplink control channel transmission based on a second value of the bit.

In a twelfth aspect, alone or in combination with one or more of the first aspect through the eleventh aspect, the frequency hopping indicator includes a first group of one or more bits indicating a resource set within the first uplink BWP, and the transmitter is further configured to perform the uplink control channel transmission based on the resource set within the first uplink BWP.

In a thirteenth aspect, alone or in combination with one or more of the first aspect through the twelfth aspect, the frequency hopping indicator includes a second group of one or more bits indicating a repetition number, and the transmitter is further configured to perform one or more repetitions of the uplink control channel transmission based on the repetition number.

In a fourteenth aspect, alone or in combination with one or more of the first aspect through the thirteenth aspect, the one or more messages are transmitted using a broadcast transmission technique prior to or after an initial access procedure.

In a fifteenth aspect, alone or in combination with one or more of the first aspect through the fourteenth aspect, the one or more messages are transmitted using a unicast transmission technique using one of a radio resource control (RRC) connection or medium access control (MAC) control element (MAC-CE) signaling.

In a sixteenth aspect, alone or in combination with one or more of the first aspect through the fifteenth aspect, the frequency hopping indicator specifies that the frequency hopping mode is enabled, and the transmitter is further configured to perform the uplink control channel transmission based on the frequency hopping mode and a resource set that is shared or partially overlapping with at least one other resource set that is used by at least one other device.

In a seventeenth aspect, alone or in combination with one or more of the first aspect through the sixteenth aspect, the frequency hopping indicator specifies that the frequency hopping mode is enabled, and the transmitter is further configured to perform the uplink control channel transmission based on the frequency hopping mode and a resource set that is separate from one or more resource sets associated with at least one other resource set that is used by at least one other device.

In an eighteenth aspect, alone or in combination with one or more of the first aspect through the seventeenth aspect, the frequency hopping indicator specifies that the frequency hopping mode is enabled and further indicates a resource set, and the transmitter is further configured to perform the uplink control channel transmission within the first uplink BWP based on the frequency hopping mode and the resource set.

In a nineteenth aspect, alone or in combination with one or more of the first aspect through the eighteenth aspect, the frequency hopping indicator specifies that the frequency hopping mode is disabled, and the transmitter is further configured to perform the uplink control channel transmission without the frequency hopping mode and based on at least a subset of a resource set that is shared or partially overlapping with at least one other resource set that is used by at least one other device.

In a twentieth aspect, alone or in combination with one or more of the first aspect through the nineteenth aspect, the frequency hopping indicator specifies that the frequency hopping mode is disabled, and the transmitter is further configured to perform the uplink control channel transmission without the frequency hopping mode and based on a resource set that is separate from one or more resource sets associated with at least one other resource set that is used by at least one other device.

In a twenty-first aspect, alone or in combination with one or more of the first aspect through the twentieth aspect, the frequency hopping indicator specifies that the frequency hopping mode is disabled and further indicates a resource set, and the transmitter is further configured to perform the uplink control channel transmission without the frequency hopping mode and based on the resource set.

In a twenty-second aspect, alone or in combination with one or more of the first aspect through the twenty-first aspect, the frequency hopping indicator specifies that the frequency hopping mode is disabled and further indicates a repetition number, and the transmitter is further configured to perform one or more repetitions of the uplink control channel transmission without the frequency hopping mode and based on the repetition number.

In a twenty-third aspect, alone or in combination with one or more of the first aspect through the twenty-second aspect, the first frequency subset of the first uplink BWP is aligned with a first boundary of a second uplink BWP that is associated with at least one other device to reduce or avoid resource fragmentation of the second uplink BWP during operation of the transmitter based on the frequency hopping mode.

In a twenty-fourth aspect, alone or in combination with one or more of the first aspect through the twenty-third aspect, the first frequency subset is aligned with a third frequency subset of a third uplink BWP associated with a third device.

In a twenty-fifth aspect, alone or in combination with one or more of the first aspect through the twenty-fourth aspect, a second boundary of the second uplink BWP is aligned with a fourth frequency subset of a third uplink BWP associated with a third device.

In a twenty-sixth aspect, alone or in combination with one or more of the first aspect through the twenty-fifth aspect, the frequency hopping indicator for uplink control information is shared among multiple uplink signals within the first uplink BWP, and the multiple uplink signals include one or more of a physical uplink control channel (PUCCH) signal, a physical uplink shared channel (PUSCH) signal, a sounding reference signal (SRS), or a physical random access channel (PRACH) signal.

In a twenty-seventh aspect, alone or in combination with one or more of the first aspect through the twenty-sixth aspect, an apparatus for wireless communication includes a receiver configured to receive, from a base station, a first indication of a bandwidth associated with the base station and further configured to receive, from the base station, a second indication of a first uplink bandwidth part (BWP). The first uplink BWP includes a first frequency subset and that further includes a second frequency subset. The apparatus further includes a transmitter configured to transmit, to the base station, an uplink signal transmission using: both the first frequency subset and the second frequency subset based on the first uplink BWP exceeding a threshold that is based at least in part on the bandwidth associated with the base station; or one of the first frequency subset or the second frequency subset based on the first uplink BWP failing to exceed the threshold.

In a twenty-eighth aspect, alone or in combination with one or more of the first aspect through the twenty-seventh aspect, the uplink signal transmission includes multiple uplink signals, and the multiple uplink signals include one or more of a physical uplink control channel (PUCCH) signal, a physical uplink shared channel (PUSCH) signal, a sounding reference signal (SRS), or a physical random access channel (PRACH) signal.

In a twenty-ninth aspect, alone or in combination with one or more of the first aspect through the twenty-eighth aspect, the threshold corresponds to a product of the bandwidth associated with the base station and a parameter having a non-negative value.

In a thirtieth aspect, alone or in combination with one or more of the first aspect through the twenty-ninth aspect, the parameter is determined by a network device and is indicated to the apparatus in system information or using radio resource control (RRC) signaling.

In a thirty-first aspect, alone or in combination with one or more of the first aspect through the thirtieth aspect, the base station and the apparatus are configured to operate in accordance with a wireless communication protocol, and the wireless communication protocol specifies the parameter based on one or more of the bandwidth of the base station, a maximum bandwidth associated with a device type, or the first uplink BWP configured by a network device based on the device type.

In a thirty-second aspect, alone or in combination with one or more of the first aspect through the thirty-first aspect, the receiver is further configured to receive, from the base station, a system information (SI) message that includes the first indication and the second indication.

In a thirty-third aspect, alone or in combination with one or more of the first aspect through the thirty-second aspect, the receiver is further configured to receive, from the base station, a system information (SI) message that includes the first indication and to receive, from the base station, a radio resource control (RRC) configuration message that includes the second indication.

In a thirty-fourth aspect, alone or in combination with one or more of the first aspect through the thirty-fourth aspect, a method of wireless communication performed by a user equipment (UE) includes receiving, from a base station, one or more messages including a frequency hopping indicator that specifies whether a frequency hopping mode is enabled or disabled for the UE. The UE is associated with a first uplink bandwidth part (BWP) that includes a first frequency subset and a second frequency subset. The method further includes transmitting, to the base station, an uplink control channel transmission using: both the first frequency subset and the second frequency subset based on the frequency hopping indicator specifying that the frequency hopping mode is enabled; or one of the first frequency subset or the second frequency subset based on the frequency hopping indicator specifying that the frequency hopping mode is disabled.

In a thirty-fifth aspect, alone or in combination with one or more of the first aspect through the thirty-third aspect, one or more of the first frequency subset or the second frequency subset includes a first contiguous group of one or more physical resource blocks (PRBs), one or more of the first frequency subset or the second frequency subset spans either a second contiguous group of symbols within a slot or a third contiguous group of symbols within multiple slots, and the first frequency subset does not overlap the second frequency subset when the frequency hopping mode is enabled for the uplink control channel transmission in the first uplink BWP.

In a thirty-sixth aspect, alone or in combination with one or more of the first aspect through the thirty-fifth aspect, the method includes transmitting a message of type one (msg1) associated with a four-step random access channel (RACH) procedure and that indicates a capability type of the UE, and the one or more messages are received based on the capability type.

In a thirty-seventh aspect, alone or in combination with one or more of the first aspect through the thirty-sixth aspect, the one or more messages include one of a message of type four (msg4) associated with the four-step RACH procedure, a downlink control channel transmission scheduling the msg4, or a combination of a downlink control channel transmission and a downlink data channel transmission.

In a thirty-eighth aspect, alone or in combination with one or more of the first aspect through the thirty-seventh aspect, the method includes transmitting a message of type three (msg3) associated with a four-step random access channel (RACH) procedure, one of a demodulation reference signal (DMRS) configuration of the msg3, a payload of the msg3, or a scrambling identifier of the msg3 indicates a capability type of the UE, and the one or more messages are received based on the capability type.

In a thirty-ninth aspect, alone or in combination with one or more of the first aspect through the thirty-eighth aspect, the one or more messages include one of a message four (msg4) associated with the four-step RACH procedure, a downlink control channel transmission scheduling the msg4, or a combination of a downlink control channel transmission and a downlink data channel transmission.

In a fortieth aspect, alone or in combination with one or more of the first aspect through the thirty-ninth aspect, the method includes transmitting a message of type A (msgA) associated with a two-step random access channel (RACH) procedure, one of a preamble of the msgA, a demodulation reference signal (DMRS) configuration of the msgA, a payload of the msgA, or a scrambling identifier of the payload indicates a capability type of the UE, and the one or more messages are received based on the capability type.

In a forty-first aspect, alone or in combination with one or more of the first aspect through the fortieth aspect, the one or more messages include one of a message of type B (msgB) associated with the two-step RACH procedure, a downlink control channel message scheduling the msgB, or a combination of a downlink control channel transmission and a downlink data channel transmission.

In a forty-second aspect, alone or in combination with one or more of the first aspect through the forty-first aspect, the one or more messages include a system information (SI) message associated with the base station.

In a forty-third aspect, alone or in combination with one or more of the first aspect through the forty-second aspect, the frequency hopping indicator includes a bit, and the uplink control channel transmission is performed using the frequency hopping mode based on a first value of the bit.

In a forty-fourth aspect, alone or in combination with one or more of the first aspect through the forty-third aspect, the method includes disabling the frequency hopping mode for the uplink control channel transmission based on a second value of the bit.

In a forty-fifth aspect, alone or in combination with one or more of the first aspect through the forty-fourth aspect, the frequency hopping indicator includes a first group of one or more bits indicating a resource set within the first uplink BWP, and the uplink control channel transmission is performed based on the resource set within the first uplink BWP.

In a forty-sixth aspect, alone or in combination with one or more of the first aspect through the forty-fifth aspect, the frequency hopping indicator includes a second group of one or more bits indicating a repetition number, and the method includes performing one or more repetitions of the uplink control channel transmission based on the repetition number.

In a forty-seventh aspect, alone or in combination with one or more of the first aspect through the forty-sixth aspect, the one or more messages are transmitted using a broadcast transmission technique prior to or after an initial access procedure.

In a forty-eighth aspect, alone or in combination with one or more of the first aspect through the forty-seventh aspect, the one or more messages are transmitted using a unicast transmission technique using one of a radio resource control (RRC) connection or medium access control (MAC) control element (MAC-CE) signaling.

In a forty-ninth aspect, alone or in combination with one or more of the first aspect through the forty-eighth aspect, the frequency hopping indicator specifies that the frequency hopping mode is enabled, and the uplink control channel transmission is performed based on the frequency hopping mode and a resource set that is shared or partially overlapping with at least one other resource set that is used by at least one other device.

In a fiftieth aspect, alone or in combination with one or more of the first aspect through the forty-ninth aspect, the frequency hopping indicator specifies that the frequency hopping mode is enabled, and the uplink control channel transmission is performed based on the frequency hopping mode and a resource set that is separate from one or more resource sets associated with at least one other resource set that is used by at least one other device.

In a fifty-first aspect, alone or in combination with one or more of the first aspect through the fiftieth aspect, the frequency hopping indicator specifies that the frequency hopping mode is enabled and further indicates a resource set, and the uplink control channel transmission is performed based on the frequency hopping mode and the resource set.

In a fifty-second aspect, alone or in combination with one or more of the first aspect through the fifty-first aspect, the frequency hopping indicator specifies that the frequency hopping mode is disabled, and the uplink control channel transmission is performed without the frequency hopping mode and based on at least a subset of a resource set that is shared or partially overlapping with at least one other resource set that is used by at least one other device.

In a fifty-third aspect, alone or in combination with one or more of the first aspect through the fifty-second aspect, the frequency hopping indicator specifies that the frequency hopping mode is disabled, and the uplink control channel transmission is performed without the frequency hopping mode and based on a resource set that is separate from one or more resource sets associated with at least one other resource set that is used by at least one other device.

In a fifty-fourth aspect, alone or in combination with one or more of the first aspect through the fifty-third aspect, the frequency hopping indicator specifies that the frequency hopping mode is disabled and further indicates a resource set, and the uplink control channel transmission is performed without the frequency hopping mode and based on the resource set.

In a fifty-fifth aspect, alone or in combination with one or more of the first aspect through the fifty-fourth aspect, the frequency hopping indicator specifies that the frequency hopping mode is disabled and further indicates a repetition number, and the method includes performing one or more repetitions of the uplink control channel transmission without the frequency hopping mode and based on the repetition number.

In a fifty-sixth aspect, alone or in combination with one or more of the first aspect through the fifty-fifth aspect, the first frequency subset of the first uplink BWP is aligned with a first boundary of a second uplink BWP that is associated with at least one other device to reduce or avoid resource fragmentation of the second uplink BWP during operation based on the frequency hopping mode.

In a fifty-seventh aspect, alone or in combination with one or more of the first aspect through the fifty-sixth aspect, the first frequency subset is aligned with a third frequency subset of a third uplink BWP associated with a third device.

In a fifty-eighth aspect, alone or in combination with one or more of the first aspect through the fifty-seventh aspect, a second boundary of the second uplink BWP is aligned with a fourth frequency subset of a third uplink BWP associated with a third device.

In a fifty-ninth aspect, alone or in combination with one or more of the first aspect through the fifty-eighth aspect, the frequency hopping indicator for uplink control information is shared among multiple uplink signals within the first uplink BWP, and the multiple uplink signals include one or more of a physical uplink control channel (PUCCH) signal, a physical uplink shared channel (PUSCH) signal, a sounding reference signal (SRS), or a physical random access channel (PRACH) signal.

In a sixtieth aspect, alone or in combination with one or more of the first aspect through the fifty-ninth aspect, a method of wireless communication performed by a user equipment (UE) includes receiving, from a base station, a first indication of a bandwidth associated with the base station and further includes receiving, from the base station, a second indication of a first uplink bandwidth part (BWP). The first uplink BWP includes a first frequency subset and that further includes a second frequency subset. The method includes transmitting, to the base station, an uplink signal transmission using: both the first frequency subset and the second frequency subset based on the first uplink BWP exceeding a threshold that is based at least in part on the bandwidth associated with the base station; or one of the first frequency subset or the second frequency subset based on the first uplink BWP failing to exceed the threshold.

In a sixty-first aspect, alone or in combination with one or more of the first aspect through the sixtieth aspect, the uplink signal transmission includes multiple uplink signals, and the multiple uplink signals include one or more of a physical uplink control channel (PUCCH) signal, a physical uplink shared channel (PUSCH) signal, a sounding reference signal (SRS), or a physical random access channel (PRACH) signal.

In a sixty-second aspect, alone or in combination with one or more of the first aspect through the sixty-first aspect, the threshold corresponds to a product of the bandwidth associated with the base station and a parameter having a non-negative value.

In a sixty-third aspect, alone or in combination with one or more of the first aspect through the sixty-second aspect, the parameter is determined by a network device and is indicated to the UE in system information or using radio resource control (RRC) signaling.

In a sixty-fourth aspect, alone or in combination with one or more of the first aspect through the sixty-third aspect, the base station and the UE are configured to operate in accordance with a wireless communication protocol, and the wireless communication protocol specifies the parameter based on one or more of the bandwidth of the base station, a maximum bandwidth associated with a device type, or the first uplink BWP configured by a network device based on the device type.

In a sixty-fifth aspect, alone or in combination with one or more of the first aspect through the sixty-fourth aspect, the method includes receiving, from the base station, a system information (SI) message that includes the first indication and the second indication.

In a sixty-sixth aspect, alone or in combination with one or more of the first aspect through the sixty-fifth aspect, the method includes receiving, from the base station, a system information (SI) message that includes the first indication and receiving, from the base station, a radio resource control (RRC) configuration message that includes the second indication.

In a sixty-seventh aspect, alone or in combination with one or more of the first aspect through the sixty-sixth aspect, an apparatus for wireless communication includes a receiver configured to communicate with a user equipment (UE) based on a first uplink bandwidth part (BWP) associated with the UE. The first uplink BWP includes a first frequency subset and further includes a second frequency subset. The apparatus further includes a transmitter configured to transmit, to the UE, one or more messages including a frequency hopping indicator that specifies whether a frequency hopping mode is enabled or disabled. The receiver is further configured to receive, from the UE, an uplink control channel transmission using: both the first frequency subset and the second frequency subset based on the frequency hopping indicator specifying that the frequency hopping mode is enabled; or one of the first frequency subset or the second frequency subset based on the frequency hopping indicator specifying that the frequency hopping mode is disabled.

In a sixty-eighth aspect, alone or in combination with one or more of the first aspect through the sixty-seventh aspect, an apparatus for wireless communication includes a transmitter configured to transmit, to a user equipment (UE), a first indication of a bandwidth associated with a base station and further configured to transmit, to the UE, a second indication of a first uplink bandwidth part (BWP). The first uplink BWP includes a first frequency subset and that further includes a second frequency subset. The apparatus further includes a receiver configured to receive, from the UE, an uplink signal transmission using: both the first frequency subset and the second frequency subset based on the first uplink BWP exceeding a threshold that is based at least in part on the bandwidth associated with the base station; or one of the first frequency subset or the second frequency subset based on the first uplink BWP failing to exceed the threshold.

In a sixty-ninth aspect, alone or in combination with one or more of the first aspect through the sixty-eighth aspect, a method of wireless communication performed by a base station includes transmitting, to a user equipment (UE), one or more messages including a frequency hopping indicator that specifies whether a frequency hopping mode is enabled or disabled for the UE. The UE is associated with a first uplink bandwidth part (BWP) that includes a first frequency subset and a second frequency subset. The method further includes receiving, from the UE, an uplink control channel transmission using: both the first frequency subset and the second frequency subset based on the frequency hopping indicator specifying that the frequency hopping mode is enabled; or one of the first frequency subset or the second frequency subset based on the frequency hopping indicator specifying that the frequency hopping mode is disabled.

In a seventieth aspect, alone or in combination with one or more of the first aspect through the sixty-ninth aspect, a method of wireless communication performed by a base station includes transmitting, to a user equipment (UE), a first indication of a bandwidth associated with the base station and further includes transmitting, to the UE, a second indication of a first uplink bandwidth part (BWP). The first uplink BWP includes a first frequency subset and that further includes a second frequency subset. The method further includes receiving, from the UE, an uplink signal transmission using: both the first frequency subset and the second frequency subset based on the first uplink BWP exceeding a threshold that is based at least in part on the bandwidth associated with the base station; or one of the first frequency subset or the second frequency subset based on the first uplink BWP failing to exceed the threshold.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein may include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

The various illustrative logics, logical blocks, modules, circuits, and processes described herein may be implemented as electronic hardware, computer software, or combinations of both. Whether such functionality is implemented in hardware or software may depend upon the particular application and design of the overall system.

A hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, the apparatus comprising:
    a transmitter configured to communicate with a base station based on a first uplink bandwidth part (BWP) that includes a first frequency subset and that further includes a second frequency subset; and
    a receiver configured to receive, from the base station, one or more messages including a frequency hopping indicator that specifies whether a frequency hopping mode is enabled or disabled,
    wherein the transmitter is further configured to transmit, to the base station, an uplink control channel transmission using:
        both the first frequency subset and the second frequency subset based on the frequency hopping indicator specifying that the frequency hopping mode is enabled; or
        one of the first frequency subset or the second frequency subset based on the frequency hopping indicator specifying that the frequency hopping mode is disabled.

2. The apparatus of claim 1, wherein the first uplink BWP corresponds to a default uplink BWP of the apparatus.

3. The apparatus of claim 1, wherein the transmitter is further configured to transmit a message indicating a capability type of the apparatus, and wherein the frequency hopping indicator is based on the capability type.

4. The apparatus of claim 3, wherein the capability type corresponds to a reduced capability (RedCap) capability type that is associated with a reduced uplink bandwidth as compared to at least one other capability type.

5. The apparatus of claim 1, wherein the transmitter is further configured to transmit a message of type one (msg1) associated with a four-step random access channel (RACH) procedure and that indicates a capability type of the apparatus, wherein the one or more messages are received based on the capability type, and wherein the one or more messages include one of a message of type four (msg4) associated with the four-step RACH procedure, a downlink control channel transmission scheduling the msg4, or a combination of a downlink control channel transmission and a downlink data channel transmission.

6. The apparatus of claim 1, wherein the transmitter is further configured to transmit a message of type three (msg3) associated with a four-step random access channel (RACH) procedure, wherein one of a demodulation reference signal (DMRS) configuration of the msg3, a payload of the msg3, or a scrambling identifier of the msg3 indicates a capability type of the apparatus, wherein the one or more messages are received based on the capability type, and wherein the one or more messages include one of a message four (msg4) associated with the four-step RACH procedure, a downlink control channel transmission scheduling the msg4, or a combination of a downlink control channel transmission and a downlink data channel transmission.

7. The apparatus of claim 1, wherein the transmitter is further configured to transmit a message of type A (msgA) associated with a two-step random access channel (RACH) procedure, wherein one of a preamble of the msgA, a demodulation reference signal (DMRS) configuration of the msgA, a payload of the msgA, or a scrambling identifier of the payload indicates a capability type of the apparatus, and wherein the one or more messages are received based on the capability type.

8. The apparatus of claim 7, wherein the one or more messages include one of a message of type B (msgB) associated with the two-step RACH procedure, a downlink control channel message scheduling the msgB, or a combination of a downlink control channel transmission and a downlink data channel transmission.

9. The apparatus of claim 1, wherein the one or more messages include a system information (SI) message associated with the base station.

10. The apparatus of claim 1, wherein the frequency hopping indicator includes a bit, and wherein the transmitter is further configured to perform the uplink control channel transmission using the frequency hopping mode based on a first value of the bit.

11. The apparatus of claim 10, wherein the transmitter is further configured to disable the frequency hopping mode for the uplink control channel transmission based on a second value of the bit.

12. The apparatus of claim 1, wherein the frequency hopping indicator includes a first group of one or more bits indicating a resource set within the first uplink BWP, and wherein the transmitter is further configured to perform the uplink control channel transmission based on the resource set within the first uplink BWP.

13. The apparatus of claim 1, wherein the frequency hopping indicator includes a second group of one or more bits indicating a repetition number, and wherein the transmitter is further configured to perform one or more repetitions of the uplink control channel transmission based on the repetition number.

14. A method of wireless communication performed by a user equipment (UE), the method comprising:
receiving, from a base station, one or more messages including a frequency hopping indicator that specifies whether a frequency hopping mode is enabled or disabled for the UE, wherein the UE is associated with a first uplink bandwidth part (BWP) that includes a first frequency subset and a second frequency subset;
transmitting, to the base station, an uplink control channel transmission using:
both the first frequency subset and the second frequency subset based on the frequency hopping indicator specifying that the frequency hopping mode is enabled; or
one of the first frequency subset or the second frequency subset based on the frequency hopping indicator specifying that the frequency hopping mode is disabled.

15. The method of claim 14, wherein the one or more messages are transmitted using a broadcast transmission technique prior to or after an initial access procedure.

16. The method of claim 14, wherein the one or more messages are transmitted using a unicast transmission technique using one of a radio resource control (RRC) connection or medium access control (MAC) control element (MAC-CE) signaling.

17. The method of claim 14, wherein the frequency hopping indicator specifies that the frequency hopping mode is enabled, and wherein the uplink control channel transmission is performed based on the frequency hopping mode and a resource set that is shared or partially overlapping with at least one other resource set that is used by at least one other device.

18. The method of claim 14, wherein the frequency hopping indicator specifies that the frequency hopping mode is enabled, and wherein the uplink control channel transmission is performed based on the frequency hopping mode and a resource set that is separate from one or more resource sets associated with at least one other resource set that is used by at least one other device.

19. The method of claim 14, wherein the frequency hopping indicator specifies that the frequency hopping mode is enabled and further indicates a resource set, and wherein the uplink control channel transmission is performed based on the frequency hopping mode and the resource set.

20. The method of claim 14, wherein the frequency hopping indicator specifies that the frequency hopping mode is disabled, and wherein the uplink control channel transmission is performed without the frequency hopping mode and based on at least a subset of a resource set that is shared or partially overlapping with at least one other resource set that is used by at least one other device.

21. The method of claim 14, wherein the frequency hopping indicator specifies that the frequency hopping mode is disabled, and wherein the uplink control channel transmission is performed without the frequency hopping mode and based on a resource set that is separate from one or more resource sets associated with at least one other resource set that is used by at least one other device.

22. The method of claim 14, wherein the frequency hopping indicator specifies that the frequency hopping mode is disabled and further indicates a resource set, and wherein the uplink control channel transmission is performed without the frequency hopping mode and based on the resource set.

23. The method of claim 14, wherein the frequency hopping indicator specifies that the frequency hopping mode is disabled and further indicates a repetition number, and further comprising performing one or more repetitions of the uplink control channel transmission without the frequency hopping mode and based on the repetition number.

24. The method of claim 14, wherein the first frequency subset of the first uplink BWP is aligned with a first boundary of a second uplink BWP that is associated with at least one other device to reduce or avoid resource fragmentation of the second uplink BWP during operation based on the frequency hopping mode.

25. An apparatus for wireless communication, the apparatus comprising:
a receiver configured to communicate with a user equipment (UE) based on a first uplink bandwidth part (BWP) associated with the UE, wherein the first uplink BWP includes a first frequency subset and further includes a second frequency subset; and
a transmitter configured to transmit, to the UE, one or more messages including a frequency hopping indicator that specifies whether a frequency hopping mode is enabled or disabled,
wherein the receiver is further configured to receive, from the UE, an uplink control channel transmission using:
both the first frequency subset and the second frequency subset based on the frequency hopping indicator specifying that the frequency hopping mode is enabled; or
one of the first frequency subset or the second frequency subset based on the frequency hopping indicator specifying that the frequency hopping mode is disabled.

26. The apparatus of claim 25, wherein the one or more messages include a system information (SI) message.

27. The apparatus of claim 25, wherein the first uplink BWP corresponds to a default uplink BWP of the UE.

28. A method of wireless communication performed by a base station, the method comprising:
transmitting, to a user equipment (UE), one or more messages including a frequency hopping indicator that specifies whether a frequency hopping mode is enabled or disabled for the UE, wherein the UE is associated with a first uplink bandwidth part (BWP) that includes a first frequency subset and a second frequency subset;
receiving, from the UE, an uplink control channel transmission using:

both the first frequency subset and the second frequency subset based on the frequency hopping indicator specifying that the frequency hopping mode is enabled; or one of the first frequency subset or the second frequency subset based on the frequency hopping indicator specifying that the frequency hopping mode is disabled.

29. The method of claim 28, wherein the one or more messages include a system information (SI) message.

30. The method of claim 28, wherein the first uplink BWP corresponds to a default uplink BWP of the UE.

* * * * *